United States Patent
Siddapura Kallappa et al.

(10) Patent No.: US 12,038,820 B2
(45) Date of Patent: Jul. 16, 2024

(54) APPARATUSES, METHODS, AND COMPUTER PROGRAM PRODUCTS FOR INDUSTRIAL AUTOMATION CONTROL SYSTEM CONFIGURATION ERROR PROCESSING

(71) Applicant: Honeywell International Inc., Morris Plains, NJ (US)

(72) Inventors: Chetan Siddapura Kallappa, Bangalore (IN); Tarun Gupta, Bangalore (IN); Manjunath Basavaraj Kama, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 409 days.

(21) Appl. No.: 16/797,544

(22) Filed: Feb. 21, 2020

(65) Prior Publication Data

US 2021/0263819 A1 Aug. 26, 2021

(51) Int. Cl.
*G06F 11/00* (2006.01)
*G06F 11/07* (2006.01)
*G06F 11/30* (2006.01)
*G06F 11/32* (2006.01)
*G06F 11/34* (2006.01)

(52) U.S. Cl.
CPC ...... *G06F 11/3051* (2013.01); *G06F 11/0772* (2013.01); *G06F 11/3006* (2013.01); *G06F 11/302* (2013.01); *G06F 11/3075* (2013.01); *G06F 11/327* (2013.01); *G06F 11/3414* (2013.01)

(58) Field of Classification Search
CPC .... G06F 11/22; G06F 11/079; G06F 11/0772; G06F 11/0784; G06F 11/0751; G06F 11/2257; G06F 11/0787; G06F 11/32
See application file for complete search history.

(56) References Cited

U.S. PATENT DOCUMENTS

| 2008/0016385 | A1* | 1/2008 | Hollingsworth | ........ H04L 41/06 714/3 |
| 2018/0309640 | A1* | 10/2018 | Nagarajan | ............... H04L 47/00 |
| 2021/0049027 | A1* | 2/2021 | Lagerholm | .......... H04L 12/4641 |

* cited by examiner

*Primary Examiner* — Charles Ehne
(74) *Attorney, Agent, or Firm* — Alston & Bird LLP

(57) ABSTRACT

Embodiments of the present disclosure generally provide for control system configuration error processing. At least some example embodiments identify a configuration error set associated with one or more subcomponents of a control system, and providing enhanced processing tools and/or insight with respect to the identified configuration error(s). Example embodiments are configured for collecting a configuration log set associated with a control system; identifying, based on at least the configuration log set and an standard configuration data object, a configuration error set associated with at least one subcomponent device of the control system; generating a configuration report data object based on the identified configuration error set; and causing rendering of a configuration action playback interface, wherein the configuration action playback interface configured based on at least the configuration error set, and wherein the configuration action playback interface is configured for user interaction.

4 Claims, 9 Drawing Sheets

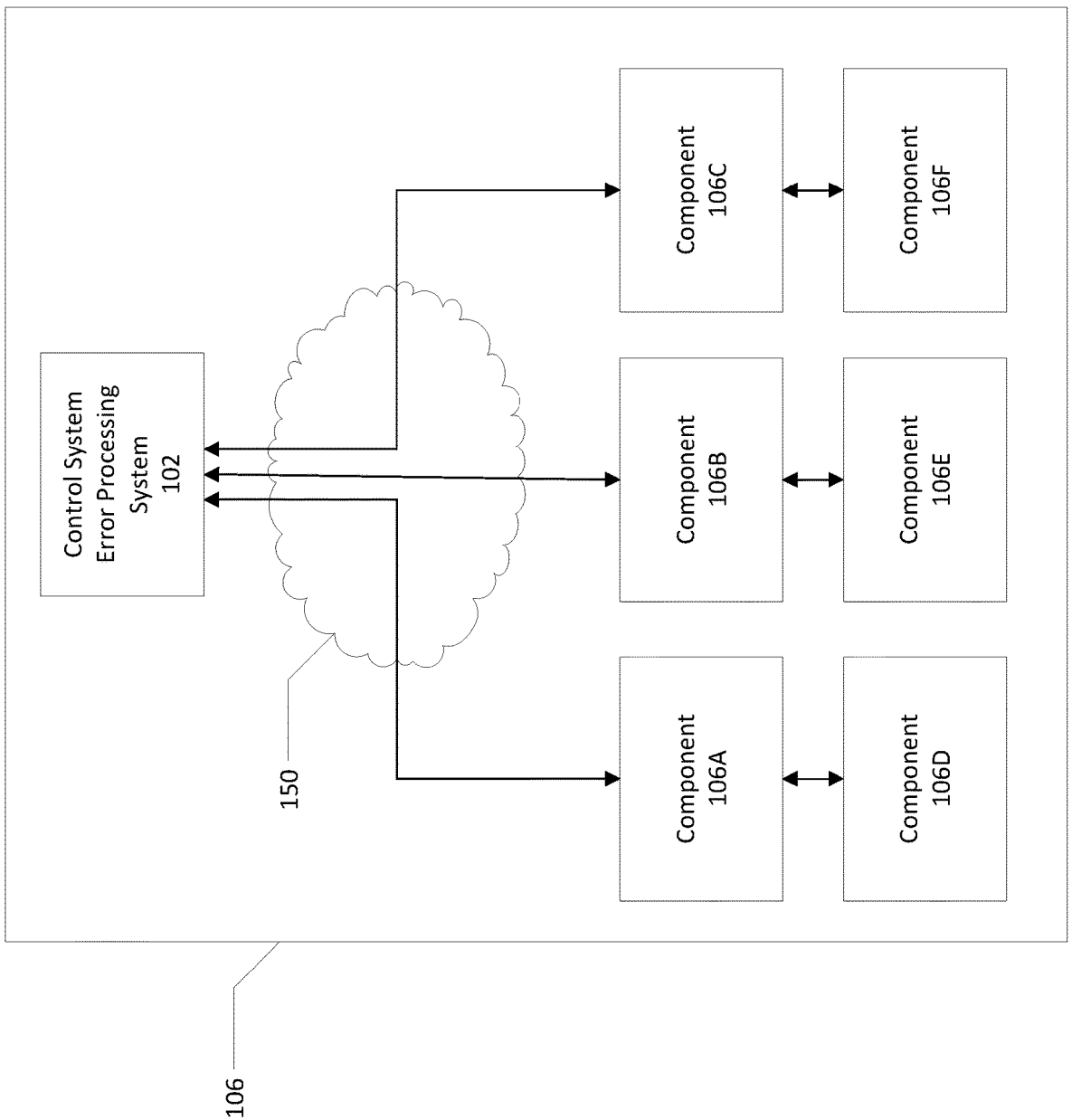

APPARATUSES, METHODS, AND COMPUTER PROGRAM PRODUCTS FOR INDUSTRIAL AUTOMATION CONTROL SYSTEM CONFIGURATION ERROR PROCESSING

TECHNOLOGICAL FIELD

Embodiments of the present disclosure generally relate to control system error management, and specifically to control system configuration error identification, processing, and remediation.

BACKGROUND

Control systems often include one or more subcomponents having various configurations, including software, and/or firmware configurations utilized in providing functionality to the control system. During operation, any number of subcomponents may experience one or more error(s) causing the control system to malfunction and/or otherwise fail to operate as desired. In some contexts, one or more user actions directly or indirectly cause the control system to malfunction. Conventional systems lack audit trails and/or data processing to enable the system, and/or a controlling user, to identify the cause of such malfunctioning, such that remediating such malfunctions of a control system is a time-consuming task often requiring significant human resources and/or expertise knowledge regarding the control system. Applicant has discovered problems with current implementations for control system error management. Through applied effort, ingenuity, and innovation, Applicant has solved many of these identified problems by developing embodied in the present disclosure, which are described in detail below.

BRIEF SUMMARY

In general, embodiments of the present disclosure provided herein provide for control system configuration error processing. Other implementations for one or more of the alternative illuminator assemblies and/or alternative illumination imaging apparatuses will be, or will become, apparent to one with skill in the art upon examination of the following figures and detailed description. It is intended that all such additional implementations be included within this description be within the scope of the disclosure, and be protected by the following claims.

In accordance with at least one aspect of the disclosure, a computer-implemented method for control system configuration error processing is provided. The computer-implemented method is implementable via any variety of hardware, software, and/or firmware implementations, and/or a combination thereof. For example, in some example implementations, the computer-implemented method is implemented via any of the apparatuses, devices, and/or systems described herein. In at least one example, the example computer-implemented method comprises collecting a configuration log set associated with a control system. The example computer-implemented method further comprises identifying, based on at least the configuration log set and an standard configuration data object, a configuration error set associated with at least one subcomponent of the control system. The example computer-implemented method further comprises generating a configuration report data object based on the identified configuration error set. The example computer-implemented method further comprises causing rendering of a configuration action playback interface associated with a configuration action recording data object, the configuration action playback interface configured based on at least the configuration error set, and where the configuration action playback interface is configured for user interaction.

Additionally or alternatively, in at least some embodiments of the example computer-implemented method, collecting the configuration log set associated with the control system comprises initiating a configuration collection agent associated with at least one subcomponent of the control system; and retrieving at least one configuration log of the configuration log set via the configuration collection agent.

Additionally or alternatively, in at least some embodiments of the example computer-implemented method, the control system comprises at least one component associated with a distributed control system or industrial automation control system.

Additionally or alternatively, in at least some embodiments of the example computer-implemented method, the computer-implemented method further comprises retrieving the standard configuration data object from a configuration datastore associated with the control system.

Additionally or alternatively, in at least some embodiments of the example computer-implemented method, at least one configuration error of the configuration error set comprises, for a subcomponent of the control system, a software configuration error or a firmware configuration error.

Additionally or alternatively, in at least some embodiments of the example computer-implemented method, the control system comprises a first control system of a plurality of accessible control systems.

Additionally or alternatively, in at least some embodiments of the example computer-implemented method, the configuration action playback interface is configured to enable selection of at least one subcomponent of the control system, where the at least one subcomponent defines a component zone for the control system.

Additionally or alternatively, in at least some embodiments of the example computer-implemented method, the configuration action playback interface comprises at least one configuration action indicator associated with the configuration error set.

Additionally or alternatively, in at least some embodiments of the example computer-implemented method, the computer-implemented method further comprises receiving a user-submitted timestamp interval, where the configuration action recording data object is configured based on the user-submitted timestamp interval.

Additionally or alternatively, in at least some embodiments of the example computer-implemented method, the control system is located at a remote location, and collecting the configuration log set associated with the control system is over a secure communications network.

Additionally or alternatively, in at least some embodiments of the example computer-implemented method, the action recording data object is retrieved from at least one datastore, and the computer-implemented method further comprises recording display data for at least one display associated with operating the control system; and storing the configuration action recording data object to at least one datastore based on at least the display data.

In accordance with yet another aspect of the present disclosure, an apparatus for control system configuration error processing is provided. In at least one embodiment, the example apparatus includes at least one processor and at least one non-transitory memory. The at least one non-transitory memory includes computer-coded instructions stored thereon, where the computer-coded instructions, in execution with the at least one processor, configure the apparatus for performing any of the example computer-implemented methods described above.

In accordance with yet another aspect of the present disclosure, a computer program product for control system configuration error processing is provided. In at least one embodiment, the example computer program product includes at least one non-transitory computer-readable storage medium. The at least one non-transitory computer-readable storage medium includes computer program code, the computer program code configured for performing any of the example computer-implemented methods described above.

BRIEF DESCRIPTION OF THE DRAWINGS

Figure 1B:
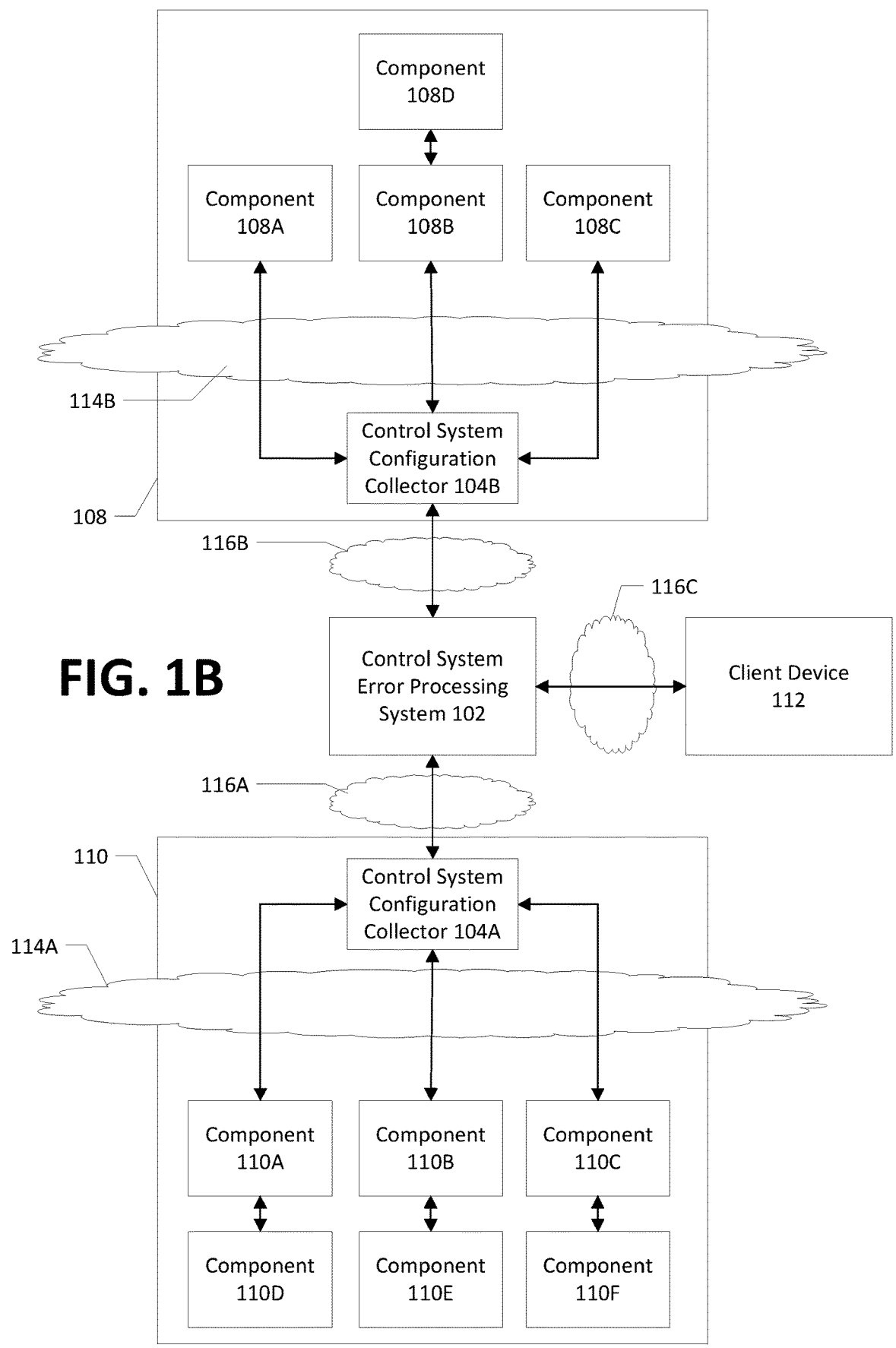
Figure 2:
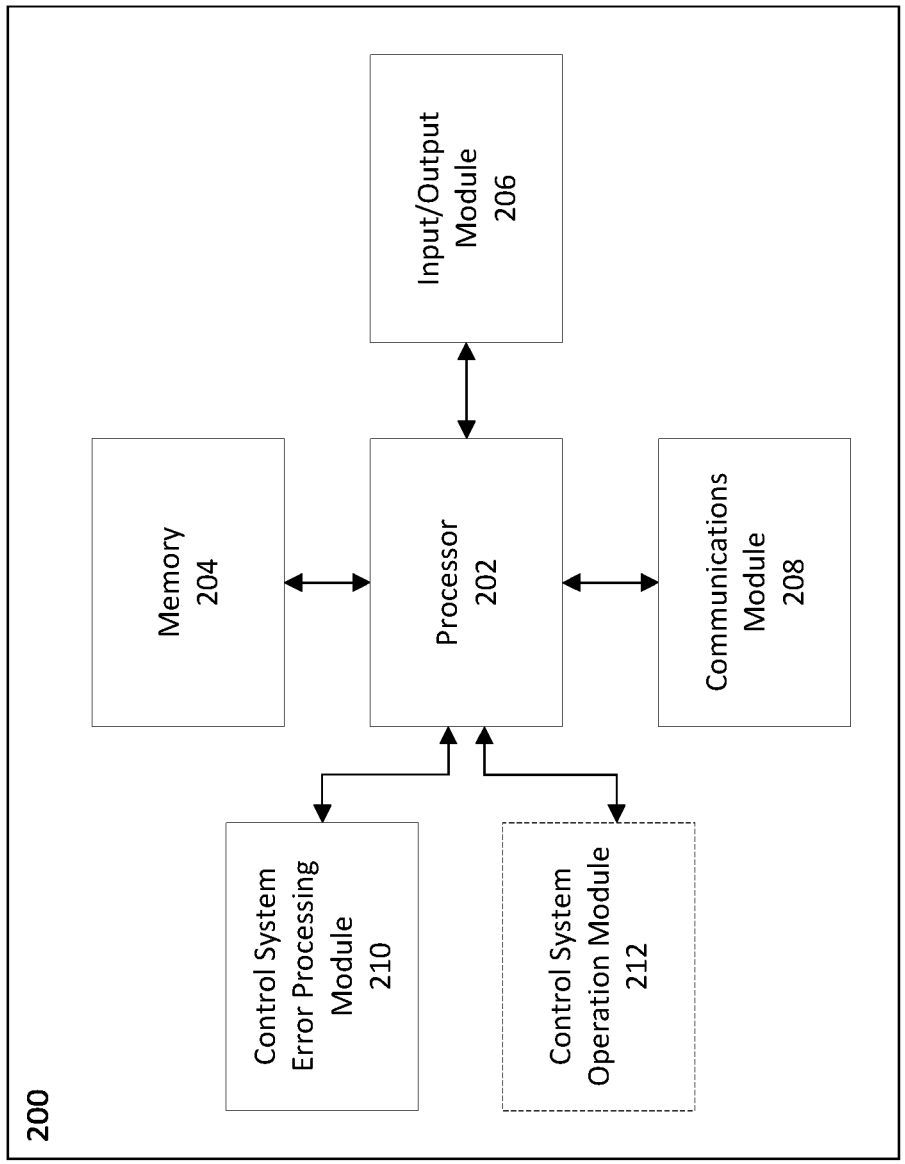
Figure 3:
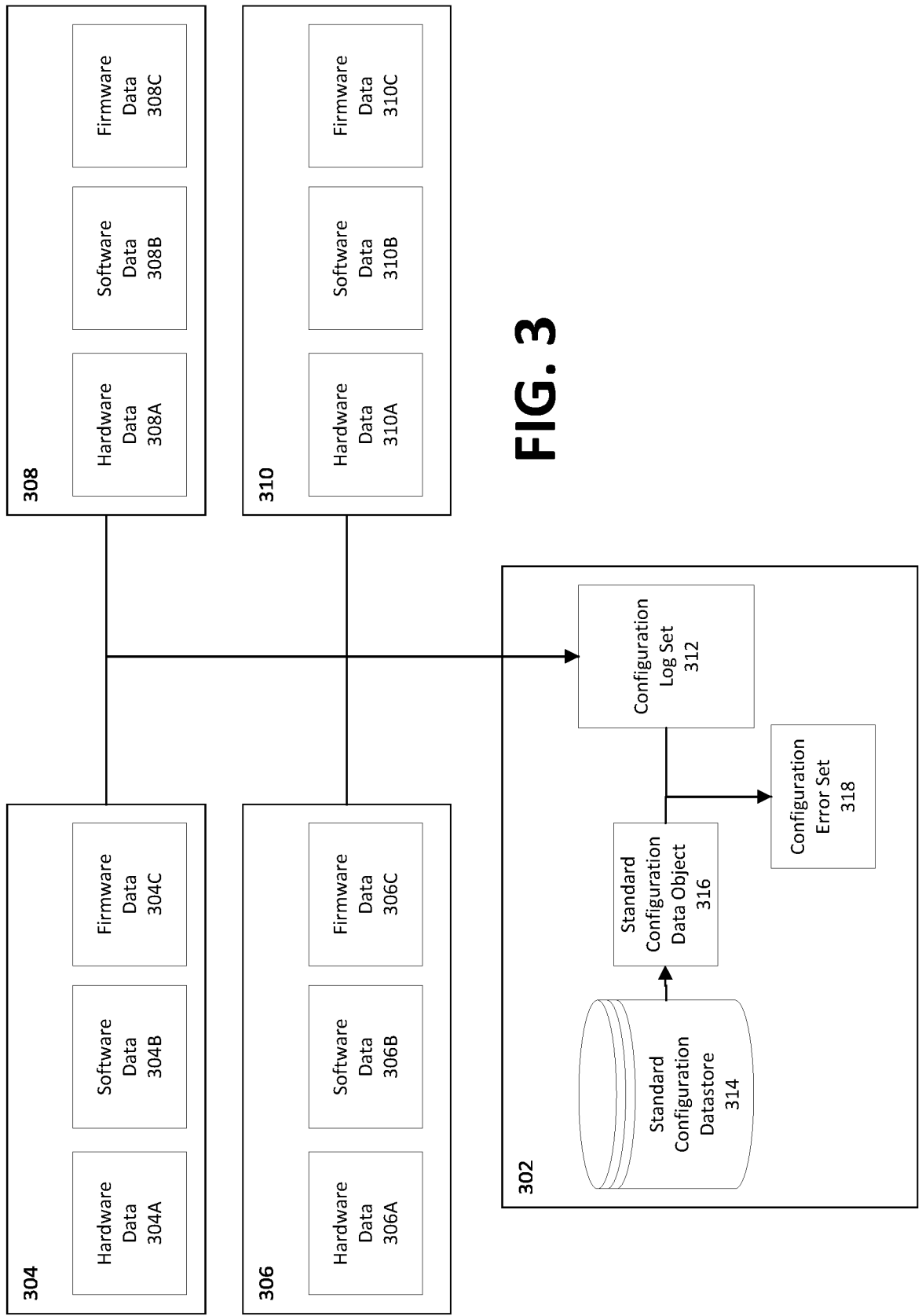
Figure 4:
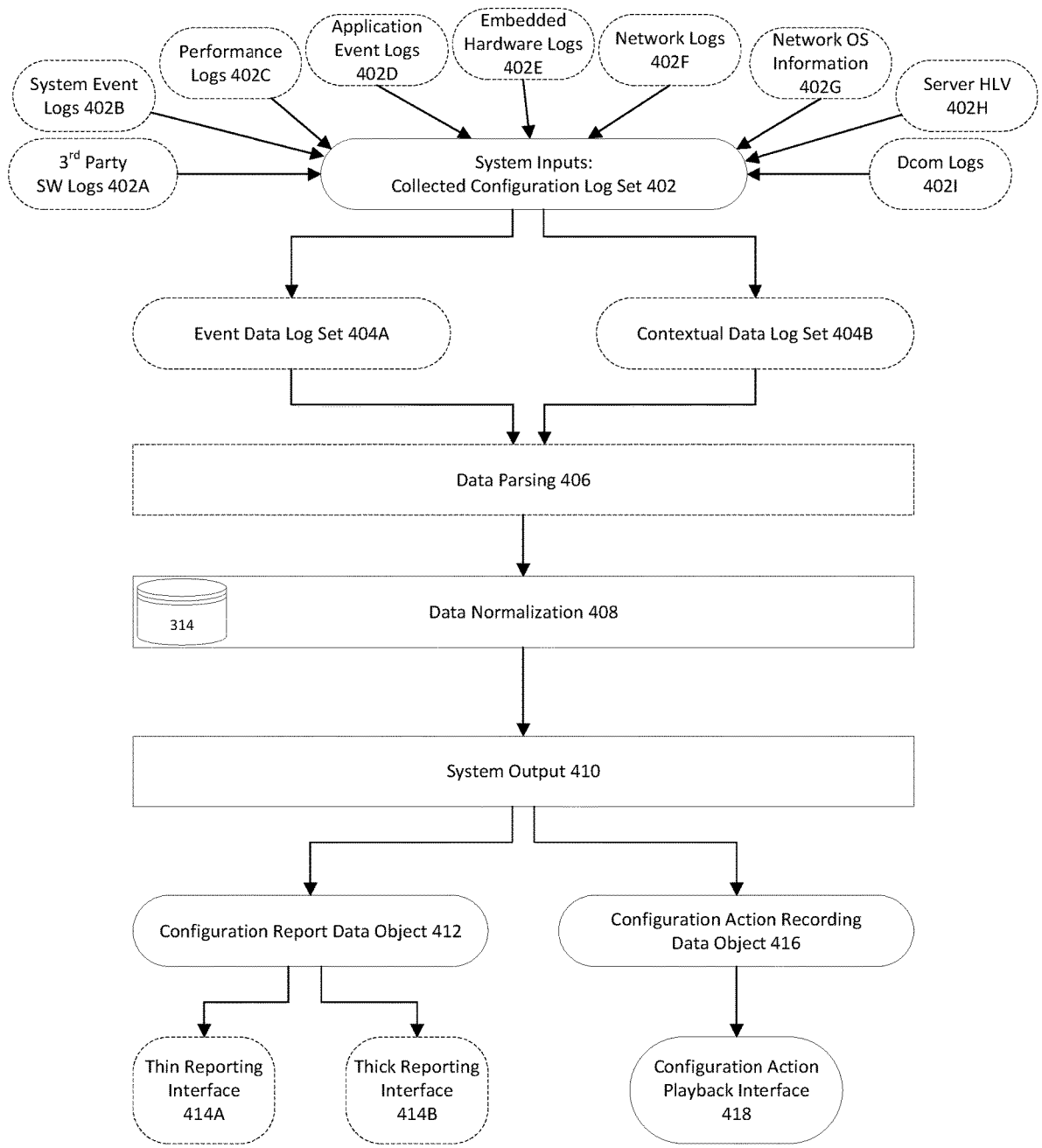
Figure 5:
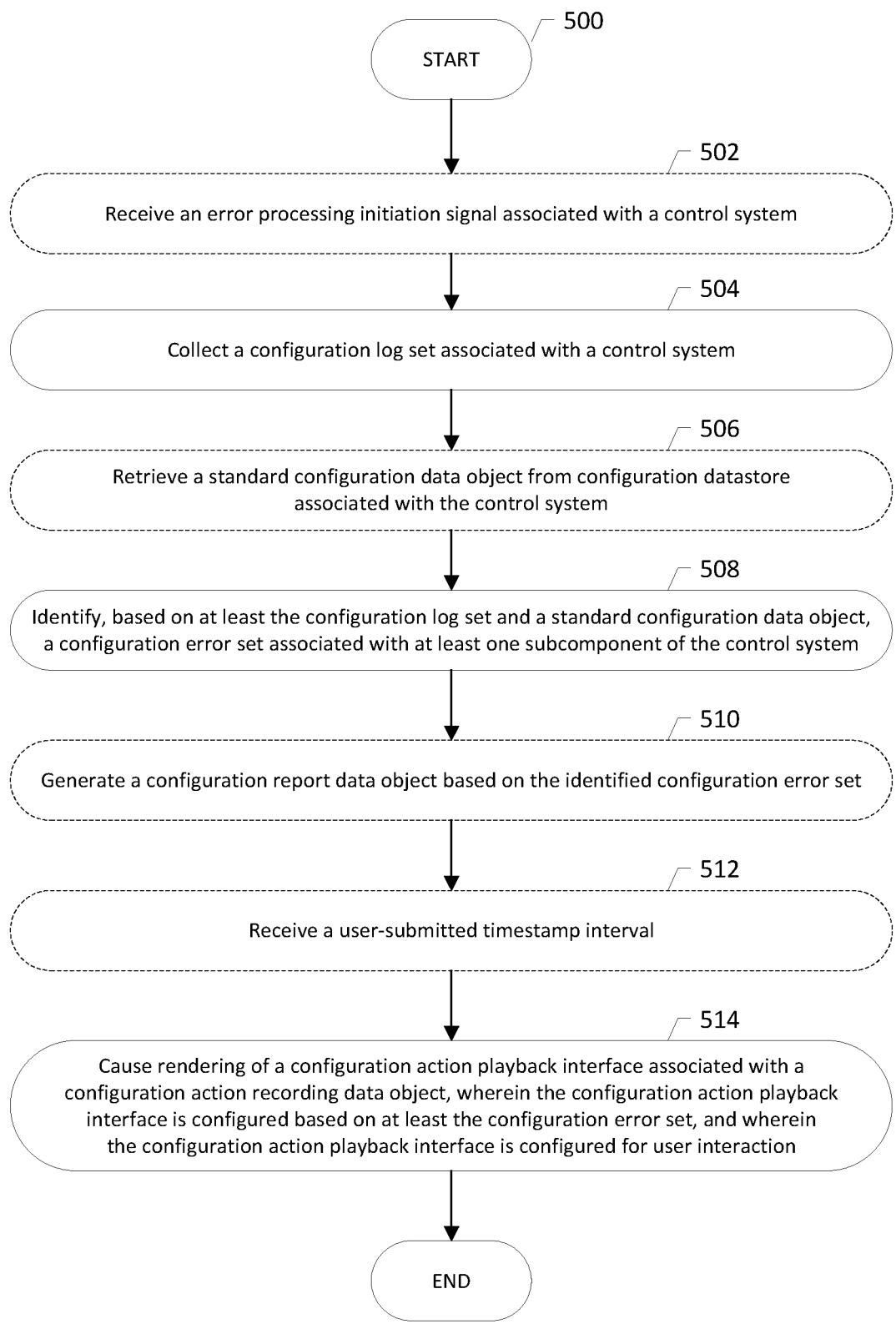
Figure 6:
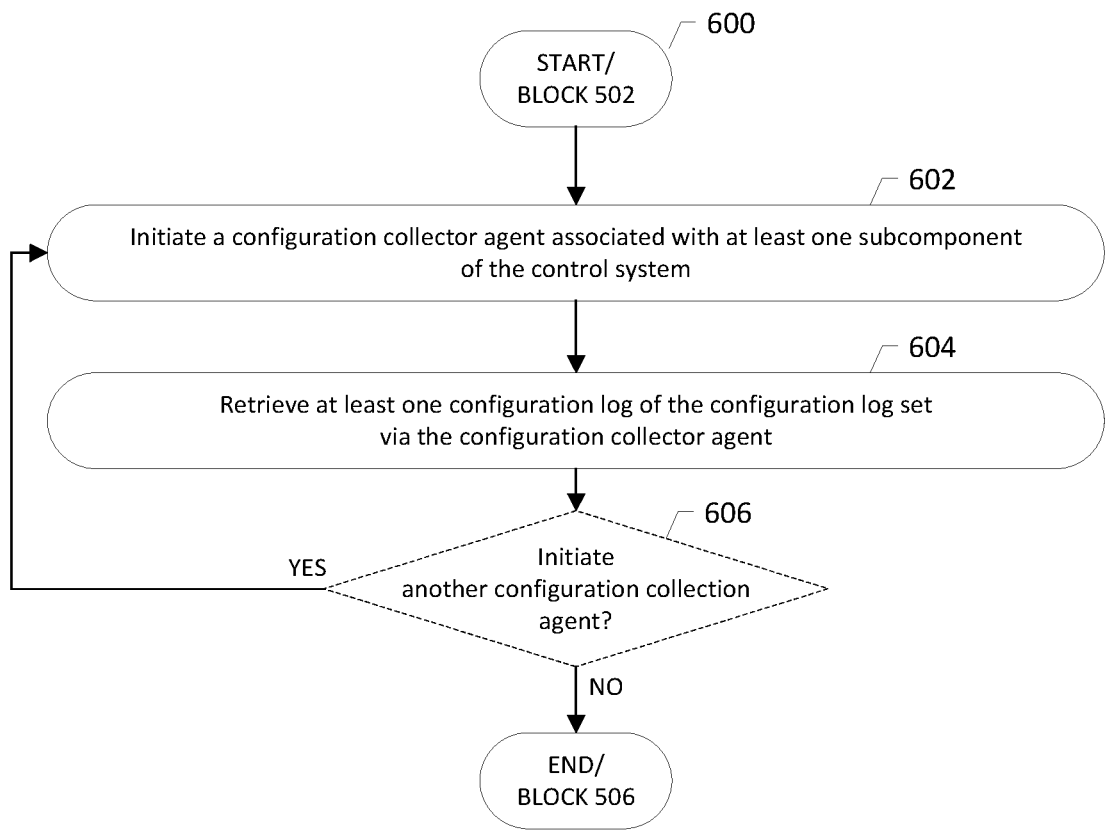
Figure 7:
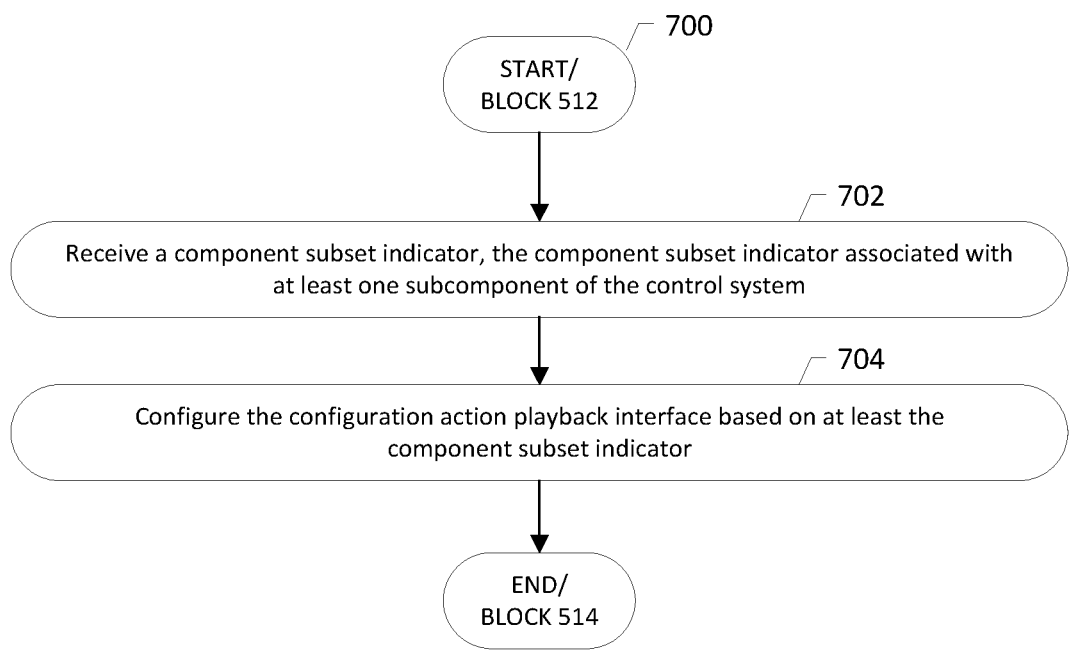
Figure 8:
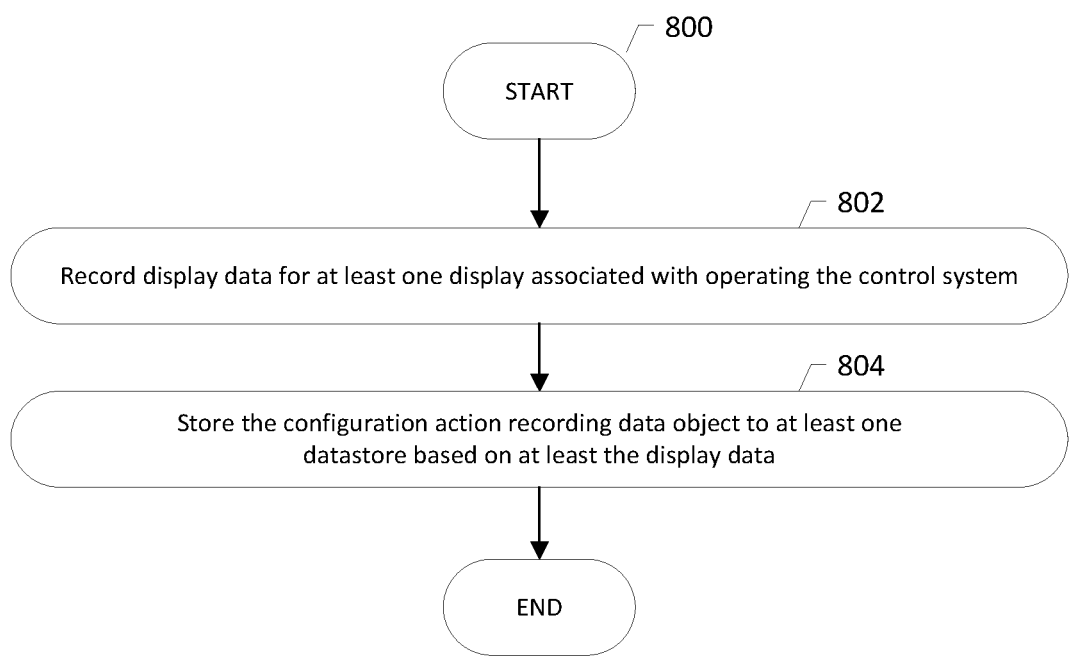

Having thus described the embodiments of the disclosure in general terms, reference now will be made to the accompanying drawings, which are not necessarily drawn to scale, and wherein:

FIG. 1A illustrates a block diagram of a system that may be specially configured within which embodiments of the present disclosure may operate;

FIG. 1B illustrates a block diagram of another system that may be specially configured within which embodiments of the present disclosure may operate;

FIG. 2 illustrates a block diagram of an example apparatus that may be specially configured in accordance with an example embodiment of the present disclosure;

FIG. 3 illustrates example computing environments, and the interactions between such computing environments, in accordance with at least one example embodiment of the present disclosure;

FIG. 4 represents an example data flow for control system configuration error processing within an example computing environment, in accordance with at least one example embodiment of the present disclosure;

FIG. 5 illustrates an example process for control system configuration error processing in accordance with at least one example embodiment of the present disclosure;

FIG. 6 illustrates additional operations of an example process for control system configuration error processing, specifically to collect a configuration log set associated with a control system, in accordance with at least one example embodiment of the present disclosure;

FIG. 7 illustrates additional operations for an example process for control system configuration error processing, specifically to configure a configuration action playback interface based on at least a zone indicator data object, in accordance with at least one example embodiment of the present disclosure; and FIG. 8 illustrates additional operations for an example process for control system configuration error processing, specifically to configure a configuration action recording data object for use in control system configuration error processing, in accordance with at least one example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Overview

In any of a number of contexts, a system may include any number of component devices. In the context of a distributed control system, for example, a human operator may access a human-machine interface for controlling various components of the control system during operation of the system. In some circumstances, a user may utilize the human-machine interface for setting one or more configuration(s) for one or more component(s) of the control system. A user may set one or more configurations of a component to enable the component to perform specific functionality. Furthermore, the same user or additional users (for example, an employee operating the control system for a subsequent shift) may further set one or more alternative configurations for a component, and/or one or more other components, and/or may further set an alternative value for the same configuration set by a previous user. In this regard, any number of user actions may cause one or more errors associated with operating the control system, for example due to errors introduced by altering configurations during prior operation of the control system. Additionally or alternatively, over time and/or otherwise during routine operation of the control system, one or more configuration(s) for one or more component(s) may become altered. For example, in some example contexts, data corruption, data deletion, software obsoleting and/or software upgrading, hardware performance deterioration, or any of a number of other configurations may cause a user operating the control system to experience errors.

Conventionally, a user lacks sufficient data to efficiently and effectively identify the cause of one or more error(s) as such error(s) occur, and therefore similarly cannot efficiently and/or effectively remediate such errors to return the control system to normal operation. Additionally or alternatively, in this regard, various systems lack suitable implementations for identifying the root cause of such errors, and/or remediating such errors based on the root cause. Without this ability, significant computing resources, human-processing resources, and capital resources are wasted to identify the cause of error(s) and/or remediate such error(s).

Accordingly, various embodiments for control system configuration error processing are provided. In this regard, some example embodiments effectively and efficiently identify configuration error(s), and cause rendering of one or more various interfaces for processing the identified configuration errors for remediation. At least some embodiments generate a configuration report data object that provides an audit trail of identified configuration errors, and/or may be utilized to trace user actions that may have caused the configuration error. Additionally or alternatively, the configuration report data object may include one or more identified remedial actions to be performed to remediate each configuration error, and/or a subset thereof Additionally or alternatively, various embodiments provide for interfaces for visualizing user actions, and/or configuration settings, that embody and/or contributed to a configuration error. In this regard, embodiments may cause rendering of a configuration action playback interface configured based on at least a configuration action recording data object. The configuration action recording data object may embody a visual representation of the actions performed by one or more users associated with detected configuration error(s), such as a video file representing a screen recording of the human-machine interface utilized for operating the control system and/or configuring the various components thereof. In some embodiments, the configuration action playback interface is configured to provide configuration action indicator(s) within the configuration action playback interface, such that the cause of one or more configuration error(s) may be readily identified and corresponding remedial actions may be initiated.

In this regard, embodiments of the present disclosure provide improved data representations and/or user interfaces that enable efficient and/or effective analysis of configuration error(s) for a control system. Such improved data representations and/or user interfaces decrease the required computing resources, human process resources, and skill level required for efficiently and effectively identifying and remediating configuration error(s) for a component of a control system. Such resources may instead be conserved without waste, while further enabling control systems to return to fully operational condition within a lesser time period. Additionally or alternatively, in some example contexts, generated and/or determined data may be utilized for providing auditing capabilities in circumstances where such functionality would provide additional insight for enabling a user to maintain a control system in an operable state.

Definitions

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The term "client device" refers to computing hardware, software, firmware, and/or a combination thereof, configured for accessing functionality associated with one or more remote system(s). In some embodiments, a client device communicates with the one or more remote system(s) over one or more communications network(s) via a series of request(s) and response(s) transmissions. In at least one example context, a client device is embodied by at least one user device, for example a workstation, office terminal, personal computer, laptop, smartphone, tablet device, wearable device, Internet-of-Things enabled device, smart-home device, and/or the like. Additionally or alternatively, in some embodiments, a client device comprises one or more server(s) controlled via communication with a user device.

The term "control system" refers to a computing system of any number of devices, wherein the devices are each accessible via communication from at least one device included in, and/or otherwise associated with, the control system. In some embodiments, a control system includes any number of L1 devices, L2 devices, L3 devices, and/or L4 devices. The terms "component" and "subcomponent" of a control system refer to a particular device of the control system, and/or combination of devices forming a sub-system of the control system. In some embodiments, a control system is uniquely identified by a "control system identifier," including one or a combination of alphanumeric, numeric, symbolic, and/or alphabetical data object(s).

The term "distributed control system" refers to a control system comprising any number of subcomponents for controlling one or more processes facilitated through functionality of the various device(s) of the control system. In some embodiments, a distributed control system includes one or more components for operation by a human-operator, for example where the component embodies or otherwise is associated with a human-machine interface configured to receive user interaction.

The term "industrial automation control system" refers to a control system configured to control any number of processes performed within an industrial plant. In at least one example embodiment, an industrial automation control system is configured for controlling various processes each associated with various component subsets of the control system.

The term "component zone" refers to a mapping of one or more components within a control system, where the one or more components are each located within a defined geographic area and/or predefined space. In an example context, a component zone refers to a mapping of components within an human-designated area of an industrial plant.

The term "configuration log" refers to one or more electronically managed data object(s) embodying information associated with operation of one or more software and/or firmware processes executed via a device and/or system, and/or one or more data object(s) embodying one or more data value(s) for the one or more software and/or firmware configuration(s), launch parameter(s), and/or setting(s) of the particular device and/or system, one or more data object(s) embodying one or more collected, retrieved, and/or generated data values associated with operational functionality of the particular device and/or system. Non-limiting examples of a configuration log include a system event log, a third-party software log, an application event log, a performance log, a network log, an embedded hardware log, and/or information associated with one or more hardware, software, and/or firmware components of the particular device and/or an associated device. The term "configuration log set" refers to one or more data objects configured for storing zero or more configuration log(s) associated with any number of components of a control system. In some embodiments, a configuration log set is embodied as structured data and/or unstructured data in one or more data structures. In some embodiments, a configuration log set comprises one data object configured to store all configuration log(s) associated with all components of a control system.

The term "standard configuration data object" refers to electronically managed data representing one or more standard values for one or more hardware, software, and/or firmware configuration(s) for any number of components in a control system. In some embodiments, a standard configuration data object is associated with a control system, for example where the standard configuration data object includes one or more standard values for one or more hardware, software, and/or firmware configuration(s) for one or more components of the associated control system.

The term "configuration datastore" refers to one or more databases, tables, views, and/or data storage devices configured for storing any number of standard configuration data object(s). In some embodiments, a configuration datastore is configured to store each standard configuration data object associated with a control system identifier for the control system with which the standard configuration data object is associated.

The term "configuration error" refers to electronically managed data embodying a determination of a processing error or an improper configuration for one or more software, and/or firmware configuration(s) for one or more component(s) of a control system. In some embodiments, a configuration error is identifiable via comparison between a configuration log associated with a component of a control system and at least one value of a standard configuration data object. The term "configuration error set" refers to an electronically managed data object including any number of configuration error(s) for any number of component(s) of a control system. In some example contexts, a configuration error set includes a plurality of configuration error(s) for at least one component, and/or at least one configuration error for a first component and at least one configuration error for a second component.

The term "software configuration error" refers to a configuration error associated with one or more configuration settings for one or more software processes executed via a component of a control system.

The term "firmware configuration error" refers to a configuration error associated with one or more configuration settings for one or more firmware processes for a component of a control system.

The term "configuration report data object" refers to an electronically managed data object embodying a structured representation of a configuration error set. In some embodiments, a configuration report data object comprises one or more data structures maintained by a computing system for use in rendering one or more associated interface(s). In some embodiments, a configuration report data object comprises one or more files embodied as one or more HyperText Markup Language (HTML) file(s), Portable Document Format (PDF) file(s), and/or text file(s), or the like.

The term "user interaction" refers to one or more electronic data signal(s), received by a computing device, embodying a user request to perform one or more actions via the computing system. Non-limiting examples of a user interaction includes a mouse click, a keystroke, a voice command, a body gesture, a touch screen tap (or multiple taps), swipe, pinch, flick, long press, a peripheral engagement, and/or the like, or a combination thereof.

The term "configuration action recording data object" refers to an electronically managed data object embodying a visual representation of one or more actions for setting one or more configuration(s) of a component by an associated user. In some embodiments, a configuration action recording data object embodies one or more video data files representing a recording of one or more display(s) of a human-machine interface with which a user interacted for setting the configuration(s) of the component. In some embodiments, a configuration action recording data object comprises and/or is constructed from a plurality of sub-data objects, for example configuration action recording data object(s) associated with smaller timestamp intervals utilized to generate a configuration action recording data object for a larger timestamp interval.

The term "configuration action playback interface" refers to a user interface configured to enable visualization and/or rendering of a configuration action recording data object. Additionally or alternatively, in some embodiments, a configuration action playback interface includes one or more controls for manipulating the configuration action recording data object, such as skipping to one or more points in time; playing, pausing, and/or stopping rendering the configuration action recording data object, and/or the like).

The term "configuration action indicator" refers to an electronically managed data object indicating a user action associated with setting one or more configuration(s) of a component at a particular timestamp. In some embodiments, a configuration action indicator further includes, or is associated with, an interface element that visually depicts the timestamp at which the user action occurred on a timeline rendered via a configuration action playback interface. In some such embodiments, user engagement with the configuration action indicator causes the configuration action recording data object to render data recorded at the timestamp associated with the configuration action indicator.

The term "user-submitted timestamp interval" refers to one or more electronically managed data object(s), received by a user, representing a first timestamp and a second timestamp defining a particular time period. In some embodiments, the user-submitted timestamp interval represents a time period, input via a client device, for which the user desires to access corresponding configuration log(s), and/or at least one configuration action recording data object, for one or more components of a control system, via one or more rendered interface(s).

The term "configuration collection agent" refers to a software-implemented process, executed on a source computing device by an associated controller computing device configured for controlling at least a portion of the source component of a control system, that is configured to collect one or more configuration log(s) associated with configuration(s) of the source device. In some embodiments, a configuration collection agent is further configured to transmit the collected configuration log(s) for the source component to the controller computing device. In some embodiments, a configuration collection agent is configured for collecting only one type of configuration for a particular component of a control system. In other embodiments, a configuration collection agent is configured for collecting a plurality of configuration types for a particular component of a control system. In some embodiments, the controller computing device comprises a second component of the control system, such as a human-machine interface for controlling the control system.

The term "communications network" refers to one or more computing devices, relays, base stations, routers, switches, cellular data towers, and/or other network devices configured to communicate with one another for transmitting data between a first computing device and a second computing device. In some embodiments, for example, a communications network is embodied by the Internet, and/or includes one or more intranet(s), one or more public wireless network(s), one or more private wireless network(s), one or more hybrid wireless network(s), and/or one or more wired connections.

The term "secure communications network" refers to a communications network configured with one or more user authentication processes to enable access to functionality for controlling a control system, for example via one or more client devices located remote from some, or all, components of the control system. In some embodiments, for example where the control system is within an industrial plant, the secure communications network enables a user to authenticate their identity, such as via a username and password, and access one or more control system(s) permitted for access by a user account associated with the authenticated user.

Example System Architecture

FIG. 1A illustrates an example computing system in which embodiments of the present disclosure may operate. FIG. 1A illustrates an overview for a system configured for control system configuration error processing, in accordance with at least some example embodiments of the present disclosure. The system may include one or more computing system(s) configured to provide functionality for control system configuration error processing with respect to an associated control system.

Specifically, as illustrated, the system includes a control system error processing system 102 in communication with a control system 106. The control system 106 may embody any of a number of control systems associated with one or more geographic areas and/or locations. For example, in some embodiments, the control system 106 embodies a distributed control system for controlling various functionality associated with an industrial plant. Alternatively or additionally, in other embodiments, the control system 106 embodies another industrial automation system.

As illustrated, the control system 106 comprises a plurality of components thereof. For example, the control system 106 comprises the control system error processing system 102 and a plurality of components 106A-106F. The components 106A-106F may embody various computing devices embodied in hardware, software, firmware, and/or the like, for facilitating various control system functionality. For example, in one example context, each of the components 106A-106F is associated with an industrial automation process, for example via operation of one or more autonomous and/or semi-autonomous machines and/or associated control devices embodied by the components 106A-106F. For example, in at least one example context, each of the components 106A-106F may embody a L2 and/or L3 device configured for performing various actions associated with controlling lower-level components (note depicted) of the control system 106.

In some embodiments, the control system error processing system 102 includes one or more computing devices, embodied in hardware, software, firmware, and/or a combination thereof, configured for performing control system configuration error processing with respect to the control system 106. In this regard, in at least one example context, the control system error processing system 102 includes at least one server (for example, embodied by at least one application server) and at least one datastore (for example, embodied by at least one database server). The at least one server and at least one datastore may communicate with one another to provide such functionality, for example where the server provides processing functionality and the datastore provides data retrieval, storage, and/or maintenance functionality. In some embodiments, the control system error processing system 102 comprises only one or more servers and is associated with at least one accessible external datastore.

In some such embodiments, for example, the control system error processing system 102 is configured, via one or more server(s) and/or datastore(s), to collect a configuration log associated with a control system. In this regard, the control system error processing system 102 may collect the configuration log set associated with each of the components 106A-106F, and in some embodiments associated with one or more configurations of the control system error processing system 102 itself. Additionally or alternatively, in some such embodiments, the control system error processing system 102 is configured, via the at least one server and at least one datastore, to identify a configuration error set associated with at least one subcomponent of the control system. The configuration error set may be identified based on at least the configuration log set and a standard configuration data object retrieved, received, and/or otherwise identified by the control system error processing system 102. In some such embodiments, the control system error processing system 102 is configured to store a standard configuration data object associated with the control system 106, for example via one or more datastore(s) embodied by and/or otherwise accessible to the control system error processing system 102. Additionally or alternatively, in some embodiments, the control system error processing system 102 is configured, via the at least one server and the at least one datastore, to generate a configuration report data object. The configure report data object may represent the identified configuration error(s) for one or more subcomponents of the control system 106, for example configuration errors associated with any of the components 106A-106F, based on at least the identified configuration error set. Additionally or alternatively, in some embodiments, the control system error processing system 102 is configured, via at least one server and at least one datastore, to cause rendering of a configuration action playback interface associated with a configuration action recording data object. The configuration action recording data object may be retrieved, received, and/or otherwise identified via the control system error processing system 102, for example where one or more configuration action recording data object(s) is/are stored during operation for processing. In some such embodiments, the configuration action playback interface configured based on at least the configuration error set, for example where the interface includes configuration action indicator(s) associated with one or more configuration error in the configuration error set, and the configuration action playback interface is configured for user interaction, such as for navigating the configuration action recording data object. In some such embodiments, the control system error processing system 102 includes and/or otherwise is associated with at least one display that may be manipulated by the control system error processing system 102 to cause rendering of one or more desired interface(s).

In some such embodiments, the control system error processing system 102 is embodied by at least one component of the control system 106. For example, in some embodiments, the control system error processing system 102 is embodied via hardware, software, firmware, and/or a combination thereof, of a L3 device of the control system 106. In this regard, the control system error processing system 102 may be located within one or more geographic area(s) associated with the control system 106, for example within the same industrial plant as the components 106A-

106F. In some embodiments, the control system error processing system 102 may be associated with a second location, for example a centralized control area associated with operating the control system 106 and/or one or more other control system(s).

As illustrated, the control system error processing system 102 is configured to communicate with one or more of the components 106A-106F via a communications network 150. In some such embodiments, the communications network 150 embodies an intranet and/or at least one private network configured to enable communication between the control system error processing system 102 and/or the components 106A-106F. Alternatively or additionally, in some embodiments, the communications network 150 comprises one or more specially configured public networks, and/or hybrid networks comprising at least a private network portion and a public network portion. Regardless of the network configuration, in some embodiments, the communications network 150 is configured such that unauthorized users cannot gain access to the control system error processing system 102 and/or components 106A-106F. In some such embodiments, the communications network 150 embodies a secure communications network configured to authenticate a user identity before permitting access to functionality associated with the control system error processing system 102 and/or communication with the components 106A-106F.

It should further be appreciated that any of the components 106A-106F may be configured for communication. For example, as illustrated, the component 106A is configured for communication with component 106D, the component 106B is configured for communication with the 106E, and the component 106C is configured for communication with the component 106F. In some contexts, the control system error processing system 102 is configured to communicate with one or more such components through communication with one or more associated components. For example, in at least one example embodiment, the control system error processing system is configured to communicate with the component 106F via one or more transmissions to the associated component 106C. Similarly, the control system error processing system 102 may communicate with the component 106D via one or more transmissions to the associated component 106A. In this regard, the control system error processing system 102 may communicate directly and/or indirectly with each component of the components 106A-106F for various purposes, for example to collect one or more configuration log(s) associated with each of the components 106A-106F.

In some embodiments, the control system error processing system 102 is configured performing various other functionality as described herein, for example alone or via one or more sub-system(s) and/or associated system(s). For example, in at least one example embodiment, the control system error processing system 102 is configured to collect configuration log(s) associated with one or more components of the component(s) 106A-106F, for example via a control system configuration collector. Additionally or alternatively, in some embodiments, the control system error processing system 102 is configured to enable operation of one or more of the component(s) 106A-106F. For example, the control system error processing system 102 may provide a human-machine interface for setting configuration(s) of the component(s) 106A-106F, and/or initiating and/or terminating processes associated with the component(s) 106A-106F. Additionally or alternatively, in some such embodiments, the control system error processing system is configured to provide functionality associated with generating configuration action recording data object(s), for example by recording display data associated with one or more displays utilized for operating one or more of the components 106A-106F.

FIG. 1B illustrates yet another example computing system in which embodiments of the present disclosure may operate. FIG. 1B illustrates an overview for a system configured for control system configuration error processing, in accordance with at least some example embodiments of the present disclosure. The system may include one or more computing system(s) configured to provide functionality for control system configuration error processing with respect to any number of control systems.

Specifically, as illustrated, the system includes a control system error processing system 102 in communication with a first control system 110 and a second control system 108. The first control system 110 may be located at a separate location from the second control system 108, for example where the first control system 110 represents a control system associated with a first industrial plant and where the second control system 108 represents a control system associated with a second industrial plant. It should be appreciated that the first control system 110 and the second control system 108 may each include any number of components. In this regard, the specific components as illustrated with respect to FIG. 1B, as well as the specific configuration as illustrated, are for exemplary purposes and not to limit the scope or spirit of this disclosure.

As illustrated, the control system 110 comprises components 110A-110F. In some such embodiments, the components 110A-110F may embody various computing devices embodied in hardware, software, firmware, and/or the like, for facilitating various control system functionality for the control system 110. In this regard, the components 110A-110F may each function similarly to the components 106A-106F as depicted and described with respect to FIG. 1A. Similarly, the control system 108 comprises components 108A-108D, which may embody various computing devices embodied in hardware, software, firmware, and/or the like, or a combination thereof, for facilitating various control system functionality for the control system 108. In this regard, the components 108A-108D may each function similarly to the components 106A-106F as depicted and described with respect to FIG. 1A.

Additionally, as illustrated, the control system 110 includes a control system configuration collector 104A, and the control system 108 includes a control system configuration collector 104B (collectively "control system configuration collectors 104"). Each control system configuration collector may be configured for collecting various configuration log(s) for the one or more components of the associated control system. For example, as illustrated, the control system configuration collector 104A may be configured to collect configuration log(s) for one or more of the components 110A-110F. Similarly, as illustrated, the control system configuration collector 104B may be configured to collect configuration log(s) for one or more of the components 108A-108D. In some such embodiments, each of the control system configuration collector(s) 104 is configured to collect the configuration log(s) in response to one or more transmissions from the control system error processing system 102 to initiate such processes. In other embodiments, the control system configuration collectors 104 are configured to collect such configuration logs automatically during operation of the control systems 110 and 108 respectively. Alternatively or additionally, in some embodiments, the control system error processing system 102 is configured to collect configuration data object(s) from one or more components of a control system, such as the components 108A-108D, directly without communication with a control system configuration collector, such as the 104A.

In this regard, each of the control system configuration collectors 104 are embodied by a subsystem of the corresponding control systems 110 and 108 respectively. For example, in some embodiments, the control system configuration collector 104A is embodied via hardware, software, firmware, and/or a combination thereof, of a L3 device of the control system 110. Similarly, the control system configuration collector 104B may be embodied via hardware, software, firmware, and/or a combination thereof, of a L3 device of the control system 108. In this regard, the control system configuration collector 104A may be located within a first location associated with the control system 110, and the control system configuration collector 104B may be located within a second location associated with the control system 108. Alternatively or additionally, in some embodiments, the control system configuration collector 104A and/or control system configuration collector 104B may be located at an alternative location from their respective control systems 110 and 108, for example at a centralized control area.

In some embodiments, the control system configuration collectors 104 are each configured for identifying configuration error(s) for one or more of the components in their associated control systems 110 and 108. For example, the control system configuration collector 104A may be configured to identify configuration error(s) for each of the components 110A-110F based at least on the collected configuration logs, and for example on a standard configuration data object associated with the components 110A-110F stored by the control system configuration collector 104A and/or otherwise accessible to the control system configuration collector 104A. In this regard, the control system configuration collector 104A may be configured to identify a configuration error set associated with the control system 110, based on the retrieved configuration logs for each component 110A-110F and the standard configuration data object. Additionally or alternatively, in this regard, the control system configuration collector 104B may be configured to in some embodiments, the control system configuration collector 104B is configured to identify a configuration error set associated with the control system 108, for example based on collector configuration log(s) for the components 108A-108D and an identified standard configuration data object associated with the components 108A-108D stored by the control system configuration collector 104B and/or otherwise accessible to the control system configuration collector 104B.

The control system error processing system 102, as illustrated, is configured to communicate with both the control system 108 and the control system 110. In this regard, the control system error processing system 102 may be configured to enable operation of, and/or configuration error processor for, the control system 108 and/or control system 110. In this regard, for example, one of the control systems 110 or 108 may be selected, via the control system error processing system 102, to perform configuration error processing.

In some embodiments, the control system error processing system 102 is configured to store, or access, standard configuration data object(s) for each communicable control system, and performs configuration error identification and/or processing based at least on information received from one or more component(s) of the control system. For example, in at least one example embodiment, the control system error processing system 102 includes one or more datastore(s) configured to store such standard configuration data objects, or otherwise is configured for accessing one or more such datastore(s). In some embodiments, the control system error processing system 102 receives a standard configuration data object from each control system, for example where the control system configuration collector 104B generates and/or otherwise provides a standard configuration data object for the control system 108 to the control system error processing system 102 and the control system configuration collector 104A provides a standard configuration data object for the control system 110 to the control system error processing system 102. In other embodiments, the control system error processing system 102 is preconfigured with such standard configuration data object(s). The control system error processing system 102 may be configured to retrieve, and/or otherwise identify, a standard configuration data object associated with a control system selected for processing. In this regard, the control system error processing system 102 is configured to enable use of an appropriate standard configuration data object in identifying configuration error(s) for the corresponding control system.

The client device 112 may be embody a user device in hardware, software, firmware, and/or any combination thereof. The client device 112 may provide access to functionality provided via the control system error processing system 102. For example, in some example embodiments, the client device 112 enables access to the control system error processing system 102 for performing control system configuration error processing as described herein for one or more control system(s). The control system error processing system 102 may, for example, receive one or more requests from the client device 112, each request corresponding to a user desire to perform one or more actions via the control system error processing system 102. Additionally or alternatively, in some embodiments, the control system error processing system 102 is configured to transmit one or more response(s) to the client device 112 in response to such requests, for example where the response(s) include data generated, retrieved, and/or otherwise identified by the control system error processing system 102. In some such embodiments, the control system error processing system 102 may provide one or more response transmission(s) including data requested by the client device 112. It should be appreciated that the control system error processing system 102 and client device 112 may be configured to communicate in any of a myriad of manners, for example using one or more application programming interface(s) (APIs) provided by the control system error processing system 102.

In some embodiments, the control system error processing system 102 is configured to enable access to specific configuration error processing functionality for a user based on permissions and/or data associated with a user account linked to the user. For example, in some example embodiments, the control system error processing system 102 is configured to perform an authentication process, such as by validating a username and password with a stored datastore including existing authenticated user accounts, to associate a client device with a corresponding user account. The user account may be permissioned for performing functionality respect to one or more control system(s) communicable with the control system error processing system 102. For example, in some embodiments, a first user account is configured only for accessing operating functionality and/or configuration error processing functionality associated with the control system 108, and thus may not have access to such functionality with respect to control system 110. Additionally or alternatively, a second user account may be configured for accessing operating functionality and/or configuration error processing functionality associated with both control systems 108 and 110, and thus may select one or more of the control systems to perform such functionality for the selected control system. In some such embodiments, the control system error processing system 102 is in communication with a plurality of control systems, and provides access to functionality for a subset of the control systems that a particular user account is configured for performing such functionality.

In some embodiments, the client device 112 includes or is otherwise associated with at least one display. The display may enable rendering of one or more interfaces via the client device 112. In this regard, the client device 112 may render data received from the control system error processing system 102 to one or more interfaces via the at least one display. Additionally or alternatively, data derived from the received data may be rendered via one or more such interfaces. In some embodiments, the interfaces are further configured to enable user interaction via the client device 112, for example via user interaction, to perform various functionality, initiate one or more request transmission(s) to the control system error processing system 102, and/or the like.

As illustrated, the control system error processing system 102 is configured to communicate with the control system 110 over a first communications network 116A, communicate with the control system 108 over a second communications network 116B, and the client device 112 over a third communications network 116C. In some embodiments, each of the communications networks 116A-116C are embodied by one or more public networks, for example embodied by the Internet. Alternatively or additionally, one or more of the communications networks 116A-116C may be embodied by one or more private network(s), and/or hybrid networks including at least one public network and at least one private network (or portions thereof). For example, in at least one example embodiment, the communications network 116C may be embodied by one or more public network(s), such as the Internet. Additionally or alternatively, the communications network 116B and/or communications network 116C may be embodied by a private communications network, hybrid communications network, and/or other secure communications network to improve network security between the control system error processing system 102 and corresponding control system.

Each of the control systems 110 and 108 may similarly be configured to enable communication of the various components thereof over one or more communications network(s). For example, as illustrated, one or more components of control system 110 may be configured to communicate over the communications network 114A, and one or more components of the control system 108 may be configured to communicate over the communications network 114B. In some embodiments, the communications network 114A embodies an intranet and/or at least one private network configured to enable communication between the components of the control system 110. Similarly, the communications network 114B embodies a separate intranet and/or separate at least one private network to enable communication between the components of the control system 108. Such communications networks 114A and 114B may be specially configured to prevent unauthorized users from gaining access to the components of the respective control system. In this regard, the communications network 114B alone or in combination with communications network 116B may embody a secured communications network for accessing the control system 108, and/or the communications network 114A alone or in combination with communications network 116A may embody a secured communications network for accessing the control system 110.

Example Apparatus of the Disclosure

The methods, apparatuses, systems, and computer program products of the present disclosure may be embodied by any variety of devices. For example, a method, apparatus, system, and computer program product of an example embodiment may be embodied by a fixed computing device, such as a personal computer, computing server, computing workstation, or a combination thereof. Further, an example embodiment may be embodied by any of a variety of mobile terminals, mobile telephones, smartphones, laptop computers, tablet computers, or any combination of the aforementioned devices.

In at least one example embodiment, the control system error processing system 102 is embodied by one or more computing systems, such as the apparatus 200 as shown in FIG. 2. The apparatus 200 may include a processor, memory 204, input/output module 206, communications module 208, and/or control system error processing module 210. Additionally or alternatively, in some embodiments, the apparatus 200 includes a control system operation module 212. In some embodiments, the control system operation module 212 is entirely optional, may be embodied by one or more of the other modules, and/or may be embodied by another system associated with the apparatus 200.

Although the components are described with respect to functional limitations, it should be understood that the particular implementations necessarily include the use of particular hardware. It should also be understood that certain of the components described herein may include similar or common hardware. For example, two modules may both leverage use of the same processor, network interface, storage medium, or the like to perform their associated functions, such that duplicate hardware is not required for each module. The use of the term "module" and/or the term "circuitry" as used herein with respect to components of the apparatus 200 should therefore be understood to include particular hardware configured to perform the functions associated with the particular module as described herein.

Additionally or alternatively, the terms "module" and "circuitry" should be understood broadly to include hardware and, in some embodiments, software and/or firmware for configuring the hardware. For example, in some embodiments, "module" and "circuitry" may include processing circuitry, storage media, network interfaces, input/output devices, and the like. In some embodiments, other elements of the apparatus 200 may provide or supplement the functionality of the particular module. For example, the processor 202 may provide processing functionality, the memory 204 may provide storage functionality, the communications module 208 may provide network interface functionality, and the like, to one or more of the other modules.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus 200 to carry out various functions in accordance with example embodiments of the present disclosure.

The processor 202 may be embodied in any one of a myriad of ways and may, for example, include one or more processing devices configured to perform independently. Additionally or alternatively, the processor 202 may include one or more processors configured in tandem via a bus to enable independent execution of instructions, pipelining, and/or multithreading. The use of the terms "processor," "processing module," and "processing circuitry" may be understood to include a single-core processor, a multi-core processor, multiple processors internal to the apparatus, other central processing unit ("CPU"), microprocessor, integrated circuit, and/or remote or "cloud" processors.

In an example embodiment, the processor 202 may be configured to execute computer-coded instructions stored in the memory 204 or otherwise accessible to the processor. Alternatively, or additionally, the processor 202 may be configured to execute hard-coded functionality. As such, whether configured by hardware or software means, or by a combination thereof, the processor 202 may represent an entity (e.g., physically embodied in circuitry) capable of performing operations according to an embodiment of the present disclosure while configured accordingly. Alternatively, as another example, when the processor is embodied as an executor of software instructions, the instructions may specifically configure the processor to perform the algorithms and/or operations described herein when the instructions are executed.

As one example context, the processor 202 may be configured to provide control system error processing functionality and/or control functionality. For example, in at least one embodiment, the processor 202 is configured to collect configuration log(s) associated with a control system, identify at least one standard configuration data object for the control system, and identify a configuration error set associated with the control system (and/or at least one component thereof). In some such embodiments, the apparatus 200 is configured to utilize the configuration error set to generate a configuration report data object and/or provide a reporting interface based on the configuration report data object, and/or utilize the configuration error set to cause rendering of a configuration action playback interface associated with a configuration action recording data object. Further, in some such embodiments, the processor is configured to identify the configuration action recording data object for use in causing rendering of the configuration action playback interface, for example based on the configuration error set and/or data received from the user (such as a user-submitted timestamp interval). Additionally or alternatively, in some embodiments, the processor 202 is configured to enable functionality for configuring various components of a control system for operation. Additionally or alternatively still, in some embodiments, the processor 202 is configured to record data associated with operation of one or more control system(s), for example display data associated with one or more display(s), and generate and/or otherwise store corresponding configuration action recording data object(s) based on the recorded data.

In some embodiments, the apparatus 200 may include input/output module 206 that may, in turn, be in communication with processor 202 to provide output to the user and, in some embodiments, to receive an indication of a user input. The input/output module 206 may comprise one or more user interfaces, and may include a display to which user interface(s) may be rendered. In some embodiments, the input/output module 206 may comprise a web user interface, a mobile application, a desktop application, a linked or networked client device, and/or the like. In some embodiments, the input/output module 206 may also include a keyboard, a mouse, a joystick, a touch screen, touch areas, soft keys, a microphone, a speaker, or other input/output mechanisms. In some such embodiments, the input/output mechanisms are configured to enable a user to provide data representing one or more user interaction(s) for processing by the apparatus 200. The processor and/or user interface module comprising the processor, for example processor 202, may be configured to control one or more functions of one or more user interface elements through computer program instructions (e.g., software and/or firmware) stored on a memory accessible to the processor (e.g., memory 204, and/or the like).

The communications module 208 may be any means such as a device or circuitry embodied in either hardware or a combination of hardware and software that is configured to receive and/or transmit data from/to a network and/or any other device, circuitry, or module in communication with the apparatus 200. In this regard, the communications module 208 may include, for example, at least a network interface for enabling communications with a wired or wireless communications network. For example, the communications module 208 may include one or more network interface cards, antennas, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The control system error processing module 210 includes hardware, software, firmware, and/or a combination thereof, configured to support error processing functionality associated with the control system error processing system 102. The control system error processing module 210 may utilize processing circuitry, such as the processor 202, to perform these actions. In some embodiments, the control system error processing module 210 includes hardware, software, firmware, and/or a combination thereof, to collect configuration log(s) associated with a control system, identify at least one standard configuration data object for the control system, identify a configuration error set associated with the control system (and/or at least one component thereof), and/or derive one or more data objects and/or interfaces based on the configuration error set. In some embodiments, the control system error processing module 210 is configured to initiate one or more processes, for example one or more configuration collection agent(s) associated with at least one component of the control system to collect configuration log(s) to be included in the configuration log set, and receive the configuration log(s) from the configuration collection agent(s). Additionally or alternatively, in some embodiments, the control system error processing module 210 includes hardware, software, firmware, and/or a combination thereof, to receive user input and/or other user-submitted data for use in configuration error processing, such as a selected control system and/or a user-submitted timestamp interval for use in identifying and/or generating a configuration action recording data object. In some embodiments, the control system error processing module 210 is configured to store to and/or retrieve from one or more datastore(s) for storing, retrieving, and/or maintaining storage of data objects, such as standard configuration data object(s) and/or configuration action recording data object(s), associated with a corresponding control system. In some embodiments, the control system error processing module 210 alone or in combination with one or more other modules, such as the input/output module 206, is configured to cause rendering of one or more interfaces associated with generated, received, derived, and/or otherwise identified data object(s), for example a reporting interface associated with a configuration report data object and/or a configuration action playback interface associated with a configuration action recording data object. It should be appreciated that, in some embodiments, the control system error processing module 210 may include a separate processor, specially configured field programmable gate array (FPGA), or a specially configured application-specific integrated circuit (ASIC).

The control system operation module 212 includes hardware, software, firmware, and/or a combination thereof, configured to support error processing functionality associated with the control system error processing system 102. The control system operation module 212 may utilize processing circuitry, such as the processor 202, to perform these actions. In some embodiments, the control system operation module 212 includes hardware, software, firmware, and/or a combination thereof, to enable operation of a control system, and/or setting of one or more configuration settings for the component(s) of the control system to enable the control system to operate. For example, in at least some embodiments, the control system operation module 212 is configured to cause rendering of a human-machine interface (HMI) associated with a control system, such that the HMI may be utilized to set one or more configuration settings for components of the control system and/or otherwise operate the control system. Additionally or alternatively, in some embodiments, the control system operation module 212 is configured to enable selection of a control system from a plurality of control systems, for example to operate the control system and/or perform configuration error processing for the control system. In some such embodiments, the control system operation module 212 and/or control system error processing module 210 are configured to provide one or more authentication processes for validating a user identity and/or identifying a corresponding user account, and/or providing functionality accessible to the user account. It should be appreciated that, in some embodiments, the control system error processing module 210 may include a separate processor, specially configured FPGA, or a specially configured ASIC.

In some embodiments, one or more of the aforementioned components is combined to form a single module. The single combined module may be configured to perform some or all of the functionality described above with respect to the individual modules. For example, in at least one embodiment, the control system error processing module 210 and the control system operation module 212 may be embodied by a single module, and/or one or more of the control system operation module 212 and/or control system error processing module 210 may be combined with the processor 202. Additionally or alternatively, in some embodiments, one or more of the modules described above may be configured to perform one or more of the actions described with respect to one or more of the other modules.

Example Computing Environments of the Disclosure

FIG. 3 illustrates example computing environments, and the interactions between such computing environments, in accordance with at least one example embodiment of the present disclosure. In this regard, FIG. 3 depicts one or more devices and/or systems, each embodied in hardware, software, and/or firmware, and corresponding data object(s) maintained by such devices and/or systems. Specifically as illustrated, for example, FIG. 3 includes components 304, 306, 308, and 310, in communication with a control system error processing system 302. In some embodiments, the components 304, 306, 308, and 310 embody a control system. Alternatively or additionally, in some other embodiments, the components 304, 306, 308, and 310 together with the control system error processing system 102 embody the control system, such as where the control system error processing system 102 is embodied by one or more device(s) within the control system (e.g., a L3 device).

Each of the components 304, 306, 308, and/or 310 may include or otherwise be associated with any number of configurations, which may be fixed and/or settable properties associated with the subprocesses and/or subcomponents of each component, such as software and/or firmware applications operating via the component. In this regard, software and/or firmware of any component may become corrupted, outdated, obsolete, incompatible, and/or otherwise cause processing errors to occur associated with the associated component. In some such embodiments, each component is configured to maintain one or more configuration log(s) embodying such configuration data and/or associated processing errors. It should be appreciated that the various data stored may be stored in any of myriad of formats, may be stored separately (e.g., in different datastores and/or different portions of a shared datastore) or together, and/or may be stored such that each configuration log is retrievable via the component. As illustrated, each of the components includes hardware data, software data, and firmware data, which may include both configuration data and/or associated operational data associated with processing errors that have occurred for the software and/or firmware executed via the component. As illustrated, component 304 is associated with hardware data 304A, software data 304B, and firmware data 304C, component 306 is associated with hardware data 306A, software data 306B, and firmware data 304C, component 308 is associated with hardware data 308A, software data 308B, and firmware data 308C, and component 310 is associated with hardware data 310A, software data 310B, and firmware data 310C. In this regard, the hardware data 304A may embody configuration log(s) associated with hardware components (including virtualized hardware components) of the component 304. Additionally or alternatively, the software data 304B may embody configuration log(s) associated with software downloaded to, installed to, and/or executed on the component 304, which may include any configuration log(s) associated with any number of third-party applications, processes, and/or the like. Additionally or alternatively still, the firmware data 304C may embody configuration log(s) associated with firmware of any of the subcomponents embodying the component 304, which may include one or more third-party components and/or third-party firmware. It should be appreciated that the similarly named data for each of the components 306, 308, and 310 may be similarly represented. Each component may maintain the hardware data, software data, and/or firmware data as one or more data objects (e.g., stored in random-access memory and/or other short-term computing memory) and/or as one or more data records stored to a persistent storage and/or other long-term computing memory (e.g., one or more datastore(s), file systems, and/or the like).

As illustrated, the control system error processing system includes configuration log set 312. The configuration log set may include any number of configuration log(s) collected from any of the components 304-310. For example, in some embodiments, the configuration log set 312 includes one or more configuration log(s) associated with at least one of the components 304-310. Additionally or alternatively, in at least one example embodiment the configuration log set 312 is embodied by at least one configuration log for a first component of the components 304-310, and at least one configuration log for a second component of the components 304-310. In this regard, it should be appreciated that the configuration log set 312 may include various numbers and/or types of configuration logs for each of the components 304-310. The configuration log set 312 may be utilized for identifying configuration mismatches, errors, and/or other computing errors caused by any one configuration of one of the components 304-310, a combination of configurations for any one of the components 304-310, and/or interactions between a combination of configurations for a combination of the components 304-310 (such as a first configuration for the component 304 and a second configuration for the component 306).

In some embodiments, the control system error processing system 102 is configured to collect the configuration log set 312 from the components 304-310. In at least one example context, the control system error processing system 102 may be configured to collect the configuration log set 312 utilizing one or more configuration collector agent(s). For example, in some embodiments, the control system error processing system 102 is configured to initiate at least one configuration collector agent for each of the components 304-310. The configuration collector agent may embody one or more software-implemented process(es), executed via the hardware, software, and/or firmware subcomponents of the component, configured to identify one or more types of configuration log(s) for the component executing the process(es) and transmitting the identified configuration log(s) to the control system error processing system 302 for processing. In some embodiments, at least one component may be associated with a plurality of configuration collector agents, for example one agent for each type of configuration log to be identified. For example, the control system error processing system 102 may initiate a first configuration collector agent to identify configuration logs associated with and/or embodied within the hardware data 310A of component 310, a second configuration collector agent to identify configuration logs associated with and/or embodied within the software data 310B of component 310, and/or a third configuration collector agent to identify configuration logs associated with and/or embodied within the firmware data 310C of the component 310. It should be appreciated that in some embodiments, even more configuration collector agents are initiated for one or more components, for example where each configuration collector agent is initiated to collect a single type of configuration log. Additionally or alternatively, in some embodiments, a single configuration collector agent is configured to identify all configuration log(s) for a particular component. Additionally or alternatively, in some embodiments, the control system error processing system 102 is preconfigured to store at least a portion of the configuration log set 312, for example based on known configurations and/or subcomponents for one or more components of the control system.

The control system error processing system 302 further includes a standard configuration datastore 314. The standard configuration datastore 314 may be embodied by a single datastore, and/or a plurality of sub-datastores, storing standard configuration data object(s) associated with at least the control system, for example the standard configuration data object 316. The standard configuration data object 316 associated with the control system may represent expected configuration values for one or more software and/or firmware processes, applications, and/or other subcomponents of one or more components of the control system, such as the components 304-310. In this regard, a first portion of the standard configuration data object 316 may embody expected configurations for the component 304, a second portion of the standard data object may embody expected configurations for the component 306, and so on for components 308 and 310. Additionally or alternatively in some embodiments, the standard configuration data object 316 includes one or more expected configuration values for a combination of configurations of one of the components 304-310, or a combination of the components 304-310. The standard configuration data object 316 may additionally or alternatively include data indicating specific performance log, configuration logs, networking logs, and/or other data logs that indicate an error in operation of at least one component of the control system. In some embodiments, the standard configuration datastore 314 is configured to store a standard configuration data object for each of a plurality of control systems, for example such that a standard configuration data object may be retrieved for a selected control system based on a control system identifier assigned to the control system and/or other data utilized for storing the standard configuration data object.

In some embodiments, as illustrated, the control system error processing system 302 is configured to identify a configuration error set, such as the configuration error set 318, based on at least the standard configuration data object 316 and the configuration log set 312. In this regard, in some embodiments, the configuration error set 318 may represent configuration error(s) identified based on the configuration log set 312 representing the current configurations for the components of the control system, and the expected configurations represented by the standard configuration data object 316. In some such embodiments, the control system error processing system 302 is configured to perform one or more determinations to identify whether a configuration error is present, for example based on a comparison between one or more data values in the standard configuration data object 316 with one or more data values of the configuration log set 312. In one such example context, the control system error processing system 302 is configured to identify a configuration error in a circumstance where one or more data values in the configuration log set 312 does not match a corresponding data value embodied in the standard configuration data object 316. It should be appreciated that any number of comparisons and/or type of comparisons may be implemented to identify a configuration error based on the result(s) of such comparisons. Accordingly, once all configuration error(s) have been identified, or one or more other stopping conditions have been met (e.g., a determined and/or predetermined number of comparisons performed, a number of configuration error(s) have been identified, and/or the like) the configuration error set 318 may be utilized for one or more actions for generating associated data objects and/or causing rendering of one or more corresponding interfaces for use by a user in processing and/or remediating the identified configuration error(s) as described herein.

FIG. 4 represents an example data flow for control system configuration error processing within an example computing environment, in accordance with at least one example embodiment of the present disclosure. In this regard, the example data flow includes various data objects and operations performed during control system configuration error processing. It should be appreciated that the data processing steps may include any number of sub-processes and/or alternative steps as described herein. Optional data objects and/or operations are depicted with dashed (or "broken") lines.

As illustrated, the computing environment includes the collected configuration log set 402. The collected configuration log set 402 may embody the system inputs for processing. As described, the collected configuration log set may include any number of configuration logs for one or more components of a control system, for example configuration log(s) collected via one or more configuration collector agent(s). FIG. 4 depicts various, non-limiting example configuration logs that may be included in the collected configuration log set 402. As illustrated, for example, the collected configuration log set 402 may include one or more of third-party software logs 402A such as any software-implemented application communicating with the any component within the control system, system event logs 402B such as those associated with the functioning of the operating system for a particular component, performance logs 402C such as logs from system hardware resources such as the CPU and/or memory operation, application event logs 402D such as one or more from operating system event logs, embedded hardware logs 402E (such as from controllers and/or programmable logic controllers of the control system), network logs 402F from various networking devices of the control system (such as switches, routers, firewall devices, and/or the like), network operating system information 402G such aspirating system logs (e.g., switch internetwork operating system logs), server HLV 402H such as detailed communication logs for operations that occur in response to operation of the distributed control system, and/or distributed component object module ("dcom") logs 402I such as for operating system access and/or other system security purposes. Such configuration logs, or any subset thereof for example, may be collected for each of any number of components embodying a control system.

In some embodiments, the collected configuration log set 402 may be characterized within one or more specific groupings of configuration log types. For example, as illustrated, the configuration logs may be characterized by an event data log set 404A and a contextual data log set 404B. The event data log set 404A may include any number of configuration logs associated with user interaction with one or more components of the control system. For example, the event data log set 404A may include data log(s) associated with operating system actions and/or user interaction with one or more applications executed via the component (for example, one or more software applications). The contextual data log set 404B may include any number of configuration logs associated with operating functionality of the component and/or one or more applications associated therewith. For example, the contextual data log set 404B may include data log(s) associated with network logs indicating network resource usage and/or accessibility, diagnostic logs such as Dr. Watson logs, historical logs associated with one or more aspects of the component, application crash logs and/or component crash logs, and/or journal and/or error messages.

The collected configuration log set 402 is processed for data parsing 406. In at least one example context, data parsing 406 comprising processing the collected configuration log set 402 to generate a standardized log format for all configuration logs in the collected configuration log set 402. The standardized log format for one or more configuration log(s) may be based on the format with which one or more corresponding data values is stored within in a standard configuration datastore. In some embodiments, each configuration log is standardized based on a characterization identified and/or otherwise associated with the configuration log. For example, in some embodiments, configuration log(s) identified as belonging to the event data log set 404A may be processed into a standard format that differs from a second standard format for data logs identified as belonging to the contextual data log set 404B. It should be appreciated that, in this regard, different characterizations of configuration logs may each be parsed based on different standard formats during data parsing 406 for any number of characterizations. Alternatively or additionally, in at least one example embodiment, two or more configurations share a particular standardized log format. The collected configuration log set 402 may be parsed during data parsing 406 to generate a standardized configuration log set for further processing.

For example, as illustrated, the generated standardized configuration log set may be utilized for data normalization 408. Data normalization 408 may utilize a standard configuration data object for comparison with the standardized configuration log set. In this regard, the standard configuration data object may be retrieved and/or otherwise identified from a standard configuration datastore, such as the standard configuration datastore 314 as depicted and described. In some embodiments, data normalization 408 includes comparing one or more data value(s) of a standardized configuration log with one or more data values of the standard configuration data object, for example to identify mismatches and/or improper current data values for one or more configurations. In this regard, data normalization 408 may utilize the standard configuration data object and/or standardized configuration log set to identify a corresponding configuration error set. The configuration error set may include a configuration error for each configuration mismatch, and/or other improper current data value, represented in the standardized configuration log set. The identified configuration error set may be utilized for further processing.

For example, as illustrated, the configuration error set may be utilized for producing a system output 410. In some embodiments, the system is configured to provide one or more outputs based on the configuration error set. For example, in at least one example embodiment, the configuration error set may be utilized to generate a configuration report data object 412. The configuration report data object 412 may represent the configuration error set and/or any additional information associated with the configuration error(s) of the configuration error set. For example, in some embodiments, a configuration report data object 412 includes explanatory information associated with each configuration error identified in the configuration error set, and/or remediation steps associated with each configuration error. In some such embodiments, the control system error processing system may be configured to identify such additional information based on stored information associated with such configuration errors, and/or via communication with one or more associated system(s) including such additional information. As described herein, in some embodiments, the configuration report data object 412 may be embodied as one or more data structures, static file types (e.g., an HTML file, PDF file, or the like), and/or the like. For example, in some such embodiments, the configuration report data object 412 may be generated based on one or more file writing methodologies, algorithms, and/or modules.

The configuration report data object 412 may be utilized in providing any number of interfaces. In some such embodiments, the configuration report data object 412 is utilized to cause rendering of one or more interface(s) via an associated client device, for example by transmitting the configuration report data object 412 to the client device. Alternatively or additionally, in some embodiments, the configuration report data object is utilized to cause rendering of one or more interface(s) to a display associated with the control system error processing system.

In at least one example embodiment, the configuration report data object 412 is utilized to cause rendering of a thin reporting interface 414A and/or a thick reporting interface 414B. The thin reporting interface 414A may include a static file representation of the configuration report data object 412. For example, the thin reporting interface 414A may be provided by one or more third-party file viewer applications executed via the control system error processing system and/or associated client device. The thick reporting interface 414B may include a web and/or native application interface comprising the configuration report data object 412. In some embodiments, the thick reporting interface 414B provides additional functionality for interacting with the configuration report data object 412, for example for filtering, searching, and/or otherwise manipulating data of the configuration report data object 412 associated with one or more configuration errors.

Additionally or alternatively, as illustrated, the system may output a configuration action recording data object 416. In at least one example embodiment, the configuration action recording data object 416 embodies display data recorded for one or more displays associated with operating the control system. In this regard, the configuration action recording data object 416 may reflect each user action performed in altering one or more configurations of a component in the control system, which may correspond to at least one configuration log in the collected configuration log set 402. The configuration action recording data object 416 may thus be processed and/or analyzed to identify the user interactions corresponding to certain configuration log(s) associated with an identified configuration error. In some embodiments, a configuration action recording data object 416 is generated and/or identified based on at least a user-submitted timestamp interval. For example, in this regard, the control system error processing system may identify data recorded within the user-submitted timestamp interval, and generate the configuration action recording data object 416 embodying at least such identified data. In this regard, the user-submitted timestamp interval may limit the data represented in the configuration action recording data object 416 to data within a critical and/or otherwise desired timestamp interval.

The configuration action recording data object 416 may be utilized to cause rendering of a configuration action playback interface 418, for example via a client device and/or a display associated with the control system error processing system. The configuration action playback interface 418 may include a rendering of the configuration action recording data object 416, and/or controls for navigating through the data embodied by the configuration action recording data object 416, such as a play button, pause button, and/or stop button, and/or a timeline configured to receive user interaction for skipping to data associated with a certain portion of the configuration action recording data object 416 (e.g., data at a certain timestamp).

In some embodiments, the configuration action playback interface 418 is rendered together with at least one configuration action indicator. For example, in some such example embodiments, each configuration log corresponding to user interaction is associated with a timestamp indicating when the user interaction occurred. The control system error processing system may determine one or more configuration log(s) utilized to identify a corresponding configuration error, and generate a configuration action indicator via the configuration action playback interface 418 to access a portion of data in the configuration action recording data object 416 that corresponds to the timestamp for the user interaction. In some such embodiments, for example where the configuration action recording data object 416 is rendered as a video via the configuration action playback interface 418 together with a video timeline, the configuration action indicator(s) may be rendered together with the video timeline and/or associated with the video timeline such that interaction with the video timeline and/or configuration action indicator begins rendering data from the configuration action recording data object 416 that corresponds to the timestamp associated with the configuration action indicator. It should be appreciated that the configuration action playback interface 418 may be rendered including any number of configuration action indicator(s) for any number of identified configuration error(s).

Example Processes of the Disclosure

Having described example systems, apparatuses, and computing environments associated with embodiments for control system error processing, example flowcharts including various operations performed by the above described apparatuses and/or systems will now be discussed. It should be appreciated that each of the flowcharts depicts an example computer-implemented process that may be performed by one or more of the above described apparatuses, systems, and/or devices, for example using one or more of the components described herein. The blocks of each process may be arranged in any of a number of ways, as depicted and described herein. In some such embodiments, one or more blocks of a first process may occur in-between one or more blocks, or otherwise operate as a sub-process, of a second process. Additionally or alternatively, the process may include some or all of the steps described and/or depicted, including one or more optional blocks in some embodiments. In regards to the below described flowcharts, one or more of the depicted blocks may be optional in some, or all, embodiments of the present disclosure. Optional blocks are depicted with broken (or "dashed") lines. Similarly, it should be appreciated that one or more of the operations of each flowcharts may be combinable, replaceable, and/or otherwise altered as described herein.

FIG. 5 illustrates an example process for control system configuration error processing in accordance with at least one example embodiment of the present disclosure. In this regard, the example process 500 may be performed by one or more specially configured systems such as a control system error processing system, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a control system, and/or a client device, to facilitate one or more of the operations of the process 500.

The example process 500 begins at optional block 502. At optional block 502, the apparatus 200 includes means, such as the control system error processing module 210, control system operation module 212, input/output module 206, communications module 208, processor 202, and/or the like, or a combination thereof, to receive an error processing initiation signal associated with a control system. In some embodiments, the error processing initiation signal is received in response to user interaction, for example via the apparatus 200 and/or an associated client device. The error processing initiation signal may represent a user desire to begin the configuration error processing associated with the control system. In some such embodiments, the error processing initiation signal includes a control system identifier associated with the control system to be processed, for example in embodiments where the apparatus 200 is associated with a plurality of control systems. For example, in some embodiments, the error processing initiation signal may be received in response to user interaction with one or more user interfaces rendered via a display associated with the apparatus 200 and/or associated with a client device. In this regard, for example, the user interface(s) may include interface elements for transmitting an error processing initiation signal for each accessible control system of a plurality of control systems. For example, the user may have completed one or more authentication process(es) to associate the user with a particular user account. In this regard, the user interface(s) provided may be configured based on an identified plurality of control systems accessible to the user account. In some such embodiments, the apparatus 200 is configured to store a set of control system identifiers associated with each user account, where the set of control system identifiers corresponds to the control system(s) accessible to the user account.

In some embodiments, the error processing initial signal includes and/or is received together with one or more indicators for selecting a particular subset of components embodying the control system. In this regard, the indicator(s) may identify the selected components for which the user selected for performing an error processing. The error processing initiation signal may include and/or be received together with a zone indicator data object that identifies one or more component(s). For example, in some embodiments, one or more interfaces for selecting a particular zone of an industrial plant may be provided, such that the corresponding zone indicator data object identifies all component(s) and/or a particular subgrouping of components (such as components of a certain type) located within the physical zone. Alternatively or additionally, in some embodiments, the indicators for selecting a particular subset of components may include a device identifier for each component selected by the user.

At block 504, the apparatus 200 includes means, such as the control system error processing module 210, control system operation module 212, input/output module 206, communications module 208, processor 202, and/or the like, or a combination thereof, to collect a configuration log set associated with a control system. In this regard, the configuration log set may include any number of configuration log(s) for one or more components of the control system, such as the control system identified at an earlier block and/or a predetermined control system. In some embodiments, the configuration log set is collected via one or more configuration collector agents. In this regard, in some such embodiments, the apparatus 200 is configured to initiate one or more configuration collector agent(s) via one or more component(s) of the control system. By initiating the one or more configuration collector agent(s), the apparatus 200 may cause each of the configuration collector agent(s) to retrieve and/or otherwise identify one or more configuration log(s) associated with the component executing the configuration collector agent, and transmit the configuration log(s) to the apparatus 200. In this regard, the apparatus 200 may collect a configuration log set comprising any number of configuration log(s) for each of one or more components of the control system. Additionally or alternatively, in some embodiments, the configuration log set may include one or more predetermined configuration log(s) for one or more components of the control system, for example based on previously received configuration log(s) for the component and/or user-generated and/or stored configuration log(s) for the component.

At optional block 506, the apparatus 200 includes means, such as the control system error processing module 210, control system operation module 212, input/output module 206, communications module 208, processor 202, and/or the like, or a combination thereof, to retrieve, from a configuration datastore, a standard configuration data object associated with the control system. The standard configuration data value may embody, and/or otherwise include, one or more data values corresponding to data values of the configuration log(s) of the configuration log set. In this regard, in at least one example context, the standard configuration data object represents expected data values for comparison with the data values embodied and/or otherwise included in each of the configuration log(s) of the configuration log set. In some such embodiments, the apparatus 200 retrieves the standard configuration data object by querying the standard configuration datastore. In some such embodiments, the configuration datastore is queried based on at least a control system identifier corresponding to the control system, such as a control system identifier received in an error processing initiation signal and/or otherwise identified at an earlier block. The apparatus 200 may receive the standard configuration data object as response data to the query. In one or more other embodiments, the apparatus 200 is preconfigured associated with at least the standard configuration data object associated with the control system, and retrieving the standard configuration data object is not performed.

At optional block 508, the apparatus 200 includes means, such as the control system error processing module 210, control system operation module 212, input/output module 206, communications module 208, processor 202, and/or the like, or a combination thereof, to identify, based on at least the configuration log set and a standard configuration data object, a configuration error set associated with at least one subcomponent of the control system. In some embodiments, the standard configuration data object embodies data retrieved and/or otherwise identified at an earlier block. The configuration error set may include any number of configuration errors for one or more of the components of the control system. For example, in at least one embodiment, the configuration error set may include a number of configuration error(s) identified for each component of the control system (which may include no identified configuration errors for one or more components), and/or for one or more combination(s) of components. In some such embodiments, one or more data values of one or more configuration log(s) represented in the configuration log set are compared with one or more corresponding data values of the standard configuration data object to identify such configuration error(s). In at least one example context, a configuration error is identified in a circumstance where the data value in a configuration log collected for a particular component does not match a corresponding value in a standard configuration data object. In this regard, the configuration error may be associated with the component that the configuration log having the mismatched data value is associated with. Additionally or alternatively, in some embodiments, the configuration error identified is based on the mismatch, one or more configurations associated with the configuration log, and/or the like. For example, in a circumstance where a configuration associated with a particular third-party application is determined to not match an associated data value of a standard configuration data object, the configuration error identified may indicate the error is a software error associated with the third-party application. In some embodiments, the configuration error is associated with the one or more configuration log(s) utilized to identify the configuration error, for example for use in identifying which user interaction(s) contributed to one or more configuration error(s).

At optional block 510, the apparatus 200 includes means, such as the control system error processing module 210, control system operation module 212, input/output module 206, communications module 208, processor 202, and/or the like, or a combination thereof, to generate a configuration report data object based on the identified configuration error set. In this regard, the configuration report data object may embody one or more files generated based on at least the configuration error set. The configuration report data object may include various information associated with the identified configuration error(s), for example, for each configuration error, the configuration report data object may include an error type, error name and/or error identifier, and/or the like. Additionally or alternatively, in some embodiments, the configuration report data object may include data from the configuration log(s) utilized to identify each configuration error, for example one or more data values for executed software configuration(s) and/or firmware configuration(s) associated with the configuration error (for example, identified as not matching a corresponding data value in the standard configuration data object). Additionally or alternatively, in some embodiments, the configuration report data object includes additional information retrieved, received, and/or otherwise identified by the apparatus 200, for example descriptive information for each configuration error and/or remediation information for each configuration error. It should be appreciated that the configuration report data object may be used for rendering any number of interface(s), for example one or more reporting interface(s) such as a thin reporting interface and/or thick reporting interface as described herein.

At optional block 512, the apparatus 200 includes means, such as the control system error processing module 210, control system operation module 212, input/output module 206, communications module 208, processor 202, and/or the like, or a combination thereof, to receive a user-submitted timestamp interval. The user-submitted timestamp interval may represent a start timestamp and an end timestamp embodying a time period that the user desires to investigate user interaction with the apparatus 200. In some such embodiments, the user-submitted timestamp interval is received in response to user interaction with the apparatus 200, and/or in response to user interaction with an associated client device. The user-submitted timestamp interval may be input by the user via one or more interfaces provided via the apparatus 200. In some embodiments, the user-submitted timestamp interval is received together with the error processing initiation signal, and/or one or more other previously received data transmissions.

At block 514, the apparatus 200 includes means, such as the control system error processing module 210, control system operation module 212, input/output module 206, communications module 208, processor 202, and/or the like, or a combination thereof, to cause rendering of a configuration action playback interface associated with a configuration action recording data object. The configuration action recording data object may embody recorded video data for one or more displays associated with operating the control system, for example recorded by the apparatus 200 and/or one or more associated system(s). In some embodiments, the apparatus 200 is configured to retrieve and/or otherwise identify the configuration action recording data object based on at least the user-submitted timestamp interval. For example, in at least one example context, the apparatus 200 is configured to retrieve and/or otherwise generate a configuration action recording data object embodying video data recorded within the user-submitted timestamp interval. In this regard, the apparatus 200 may store and/or otherwise access recorded data for a recording storage timestamp interval, for example within 2 hours, 1 day, 2 days, and/or the like. In some such embodiments, the apparatus 200 is configured to enable a user to set the recording storage timestamp interval, for example via one or more associated user interfaces comprising interface element(s) to input the recording storage timestamp interval. Additionally or alternatively, in some embodiments, the configuration action playback interface includes a video timeline associated with the configuration action recording data object, for example such that user interaction with the video timeline is configured to cause rendering of video data embodied in the configuration action recording data object at a timestamp corresponding to the user interaction with the video timeline.

In some embodiments, the configuration action playback interface is configured based on at least the configuration error set. In some embodiments, the apparatus 200 is configured to generate one or more configuration action indicator(s) associated with the configuration error set. In this regard, the configuration action indicator(s) may be provided associated with one or more timestamp(s) at which a user interaction was performed, which may be represented within one or more configuration log(s) associated with each configuration error. In some embodiments, for example, the configuration action playback interface includes such configuration action indicator(s) rendered associated with a video timeline associated with the configuration action recording data object. In at least one example context, the configuration action indicator(s) may be rendered on and/or associated with the video timeline of the configuration action playback interface such that user interaction with a configuration action indicator causes rendering of video data of the configuration action recording data object at timestamp associated with the configuration action indicator. In some embodiments, the configuration action playback interface is configured for further user interaction, for example to enable playing, pausing, stopping, skipping, and/or other altering of the rendered data of the configuration action recording data object.

Additionally or alternatively, in at least some embodiments, the apparatus 200 is configured to cause rendering of the configuration action playback interface including and/or associated with one or more other interfaces. For example, in at least one example embodiment, the configuration action playback interface is rendered including and/or associated with a reporting interface associated with the configuration report data object.

FIG. 6 illustrates additional operations of an example process for control system configuration error processing, specifically to collect a configuration log set associated with a control system, in accordance with at least one example embodiment of the present disclosure. In this regard, the example process 600 may be performed by one or more specially configured systems such as a control system error processing system, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a control system, and/or a client device, to facilitate one or more of the operations of the process 600.

The illustrated process 600 begins at block 602. In some embodiments, the process 600 begins after one or more of the blocks depicted and/or described with respect to one of the other processes described herein. For example, in some embodiments as described, the process begins after execution of block 502. In this regard, the process 600 may replace or supplement one or more blocks depicted and/or described with respect to one of the other processes described herein. For example, in some embodiments as depicted, the process 600 depicted with respect to FIG. 6 supplants, supplements, and/or otherwise replaces the operation depicted and described with respect to block 504. Additionally or alternatively, as depicted, upon completion of the process 600 and/or one or more operations associated therewith, flow may return to one or more operations of another process, for example to block 506 as depicted.

At block 602, the apparatus 200 includes means, such as the control system error processing module 210, control system operation module 212, input/output module 206, communications module 208, processor 202, and/or the like, or a combination thereof, to initiate a configuration collector agent associated with at least one subcomponent of the control system. In this regard, the configuration collector agent may be executed via the subcomponent for retrieving and/or otherwise identifying configuration log(s) associated with the subcomponent of the control system. The configuration collector agent may be configured to identify one or more configuration log(s) for the subcomponent of the control device. For example, the configuration collector agent may perform one or more processes for identifying such configuration log(s) based on interaction with software, hardware, and/or firmware of the subcomponent, for example utilizing at least one or more processes provided via the operating system of the subcomponent. In some embodiments, the configuration collector agent is configured to retrieve only one type of configuration log associated with the subcomponent. Alternatively or additionally, in some embodiments, the configuration collector agent is configured to retrieve a plurality of types of configuration log.

At block 604, the apparatus 200 includes means, such as the control system error processing module 210, control system operation module 212, input/output module 206, communications module 208, processor 202, and/or the like, or a combination thereof, to retrieve at least one configuration log of the configuration log set via the configuration collector agent. In some such embodiments, the apparatus 200 is configured to cause the configuration collector agent to transmit configuration log(s) identified by the configuration collector agent. In some embodiments, the configuration collector agent is configured to transmit the configuration log(s) automatically in response to being initiated. Alternatively or additionally, in some embodiments, to retrieve the at least one configuration log, the apparatus 200 is configured to transmit one or more request(s) to the configuration collector agent to cause the configuration collector agent to transmit one or more requests to the apparatus 200. In some such embodiments, the apparatus 200 is configured to store retrieved configuration log(s), via the configuration log set, for processing.

At optional decision 606, the apparatus 200 includes means, such as the control system error processing module 210, control system operation module 212, input/output module 206, communications module 208, processor 202, and/or the like, or a combination thereof, to determine whether to initiate another configuration collector agent. In some embodiments, the apparatus 200 is preconfigured to initiate configuration collector agent(s) for particular components of the control system (such as all components of the control system, certain types of components in the control system, and/or the like). Alternatively or additionally, the apparatus 200 may be configured to initiate a plurality of configuration collector agent(s) for a particular component of the control system. In at least one circumstance where the apparatus 200 determines to initiate another configuration collector agent, flow may return to block 602. Additionally or alternatively, in a circumstance where the apparatus 200 determines not to initiate another configuration collector agent, such as when all configuration collector agents have already been initiated, flow may continue to one or more subsequent blocks, for example ending the process or returning to block 506.

FIG. 7 illustrates additional operations for an example process for control system configuration error processing, specifically to configure a configuration action playback interface based on at least a zone indicator data object, in accordance with at least one example embodiment of the present disclosure. In this regard, the example process 700 may be performed by one or more specially configured systems such as a control system error processing system, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a control system, and/or a client device, to facilitate one or more of the operations of the process 600.

The illustrated process 700 begins at block 702. In some embodiments, the process 700 begins after one or more of the blocks depicted and/or described with respect to one of the other processes described herein. For example, in some embodiments as described, the process begins after execution of block 512. In this regard, the process 700 may be additional to, replace, and/or supplement one or more blocks depicted and/or described with respect to one of the other processes described herein. For example, in some embodiments as depicted, the process 700 depicted with respect to FIG. 7 may be supplement the operations depicted with respect to FIG. 5. Additionally or alternatively, as depicted, upon completion of the process 700 and/or one or more operations associated therewith, flow may return to one or more operations of another process, for example to block 514 as depicted. Additionally or alternatively, in some embodiments, the flow may end upon completion of the process 700.

At block 702, the apparatus 200 includes means, such as the control system error processing module 210, control system operation module 212, input/output module 206, communications module 208, processor 202, and/or the like, or a combination thereof, to receive a component subset indicator, the component subset indicator associated with at least one subcomponent of the control system. In this regard, for example, the component subset indicator may correspond to a subset of subcomponents of the control system, which may include one or more subcomponents of the control system. In some embodiments, for example, the component subset indicator may correspond to one or more subcomponents of the control system that are mapped together as part of a shared area. In one example context, the one or more subcomponent(s) may embody a plurality of devices, machines, and/or systems within a particular area of an industrial plant. In some such embodiments, the component subset indicator is received in response to user interaction with one or more rendered interfaces, for example rendered via a display associated with the apparatus 200 and/or an associated client device. In some such embodiments, the component subset indicator received corresponds to user input performed via the one or more interfaces, for example by interacting with interface element(s) for selecting the subcomponent(s) associated with a particular component subset indicator and/or selecting a group predefined to include one or more components of the control system. In some example contexts, the apparatus 200 is preconfigured to associate a control system with at least one subset of components embodying a "zone," and may include any number of component subset(s) associated with any number of zones. In this regard, it should be appreciated that the zone At block 704, the apparatus 200 includes means, such as the control system error processing module 210, control system operation module 212, input/output module 206, communications module 208, processor 202, and/or the like, or a combination thereof, to configure the configuration action playback interface based on at least the component indicator. For example, in some such embodiments, the configuration action playback interface is configured to only include configuration action indicator(s) associated with configuration errors identified for the subcomponents represented in the component subset indicator. In this regard, the apparatus 200 may enhance the configuration playback interface to improve usability with respect to enabling a user to efficiently identify a root cause of one or more configuration error(s) for the components selected. For example, in at least one example context where the component subset indicator corresponds to subcomponents associated with the control system and located within a particular area, for example zone, the configured configuration action playback interface may enable a user to more easily identify and review video data corresponding to timestamps for which one or more configuration(s) for such components were altered.

Additionally or alternatively, in some embodiments, the apparatus 200 is configured to generate an updated configuration report data object based on at least the component subset indicator. Additionally or alternatively still, in some embodiments, the apparatus 200 is configured to cause rendering of an updated reporting interface based on at least the updated configuration report data object. In this regard, the updated configuration report data object may be generated based on configuration error(s), of the configuration error set, that are associated with components represented in the component subset indicator. As such, the updated configuration report data object, and/or corresponding interface(s), may include configuration error information only for those configuration errors associated with components selected for processing by the user.

FIG. 8 illustrates additional operations for an example process for control system configuration error processing, specifically to configure a configuration action recording data object for use in control system configuration error processing, in accordance with at least one example embodiment of the present disclosure. In this regard, the example process 800 may be performed by one or more specially configured systems such as a control system error processing system, for example embodied by the specially configured apparatus 200. In this regard, in some such embodiments, the apparatus 200 is specially configured by computer program instructions stored therein, for example in the memory 204 and/or another component depicted and/or described, and/or otherwise accessible to the apparatus 200, for performing the operations as depicted and described. In some embodiments, the specially configured apparatus includes and/or otherwise is in communication with one or more other apparatuses, systems, devices, and/or the like, to perform one or more of the operations as depicted and described. For example, the apparatus 200 may include and/or communicate with one or more components of a control system, and/or a client device, to facilitate one or more of the operations of the process 600.

The illustrated process 800 begins at block 802. In some embodiments, the process 800 occurs in parallel with any of the processes described herein, for example as a user operates a control system via the apparatus 200 and/or an associated system. In this regard, the process 800 may be repeated any number of times for any number of recorded data frames. Alternatively or additionally, in some embodiments, the process 700 begins after one or more of the blocks depicted and/or described with respect to one of the other processes described herein. For example, in some embodiments as described, the process begins after execution of one or more blocks of process 500, and/or any subprocess thereof. In some embodiments, upon completion of the process 800 and/or one or more operations associated therewith, flow may continue to repeat the process 800 at a later time. Additionally or alternatively, in at least some example instances, upon completion of the process 800 and/or one or more operations associated therewith, flow may terminate and/or proceed to one or more of the other processes as described herein (for example process 500 as described with respect to FIG. 5).

At block 802, the apparatus 200 includes means, such as the control system error processing module 210, control system operation module 212, input/output module 206, communications module 208, processor 202, and/or the like, or a combination thereof, to record display data for at least one display associated with operating the control system. In some such embodiments, the apparatus 200 may provide one or more interfaces for operating the control system, such as via a display included in and/or otherwise associated with the apparatus 200, and/or associated with an associated client device utilized by the user for accessing functionality of the apparatus 200. In at least one example context, the apparatus 200 causes rendering of a human-machine interface to the display for use in operating the control system. For example, via user interaction with the human-machine interface, the user may set one or more configurations of the components of the control system, and/or monitor various aspects associated with the components to ensure the control system remains operable.

In some embodiments, the apparatus 200 records the display data in any of a myriad of manners. For example, in at least one example embodiment, the apparatus 200 utilizes one or more known screen recording methodologies, packages, and/or the like to record the display data. Additionally or alternatively, in at least some embodiments, the apparatus 200 is configured to record the display data through one or more API requests and/or transmissions, for example to a client device configured for rendering to the display. The display data may represent any of a number user actions, for example user interactions for altering one or more configuration(s) for one or more component(s) of the control system, and/or interaction with one or more software applications of any component of the control system. In this regard, such user action may be captured within the display data and associated with one or more configuration log(s) generated in response to the user interaction with one or more such component(s).

At block 804, the apparatus 200 includes means, such as the control system error processing module 210, control system operation module 212, input/output module 206, communications module 208, processor 202, and/or the like, or a combination thereof, to store the configuration action recording data object to at least one datastore based on at least the display data. In this regard, in at least some embodiments, the display data may be stored to the one or more datastore(s) as a new configuration action recording data object. In some such embodiments, the configuration action recording data object may be associated with one or more timestamp(s), for example a start timestamp associated with the beginning of the recording and end timestamp associated with termination of the recording. Alternatively or additionally, the display data may be stored to the one or more datastore(s) as appended to the configuration action recording data object, for example such that the configuration action recording data object includes the newly recorded display data for a particular timestamp interval.

In some such embodiments, the apparatus 200 may be configured to store only a limited amount of display data within the configuration action recording data object. For example, in at least one example context, the apparatus 200 may be associated with a recording storage timestamp interval associated with the control system, for example such that the configuration action recording data object represents recorded display data for a most recent time period defined by the recording storage timestamp interval for the control system. It should be appreciated that, as described, the recording storage timestamp interval may be configured by a user, for example via one or more interfaces for configuring information associated with the control system. Non-limiting examples of a recording storage timestamp interval include 2 hours, 1 day, 2 days, and/or the like. In this regard, computing resources of the apparatus 200 may be preserved by reducing the total amount of recorded data that must be continuously stored, while still enabling a user to access sufficient display data to meet their auditing requirements and/or goals.

It should be appreciated that the configuration action recording data object, and/or a portion thereof, may be received during control system error processing. For example, in at least one example context, a reduced configuration action recording data object embodying a portion of the stored action recording data object is utilized based on a user-submitted timestamp interval. In this regard, the reduced configuration action recording data object may embody recorded display data embodied in the stored configuration action recording data object within the time period represented by the user-submitted timestamp interval. In this regard, a user may retrieve the display data for processing and/or utilization by a user for analyzing user interaction with the control system during a desired timestamp interval. Such flexibility enables one or more corresponding interfaces to be rendered that improve the user's ability to efficiently and effectively identify user interactions and/or configuration(s) representing the cause of configuration errors for a control system, and/or more readily begin remediating such configuration errors once identified without wasting additional computing resources.

Example Configuration Errors

Any of a myriad of configuration errors may be identified by the control system error processing system, for example embodied by the apparatus 200. Such configuration error(s) may be associated with any number of improper user actions, malware configurations, system failure(s), and/or the like. In one example context, such configuration error(s) may include configuration errors associated with an HMI operator console, for example executed via a device functioning as a HMI station. Non-limiting examples include the apparatus 200 identifying that the HMI operator console has not been configured to operate a HMI, that another component linked to the HMI operator console already is operating as the HMI operator console (e.g., another device opened with the same station number), and/or that a primary server cannot be contacted (e.g., due to server switchover). Alternatively or additionally, in some contexts, the apparatus 200 may identify that an HMI was not displayed because a reference could not be located in a corresponding datastore, and/or a custom display file path is not updated in a station configuration.

Additionally or alternatively, the apparatus 200 may be configured to identify one or more configuration error(s) associated with the engineering of one or more components of the control system, such as between client component(s) and/or server component(s). For example, in at least one example context the apparatus 200 may identify that a host file is not updated in one or more server component(s). Additionally or alternatively, the apparatus 200 may identify that the server name in incorrectly reflected in a configuration form (e.g., due to a typo). Additionally or alternatively, the apparatus 200 may identify one or more additional erroneous configurations between a client and server. Additionally or alternatively, the apparatus 200 may identify that tags are not published from a safety manager builder, and/or that an invalid configuration is present on one or more component(s) associated with the safety manager builder.

Additionally or alternatively, the apparatus 200 may be configured to identify one or more configuration error(s) associated with third-party integrations with one or more components of the control system. For example, the apparatus 200 may identify configuration error(s) in peer communication data interface and/or OLE for process control communications between third-party systems, such as due to improper permission configuration(s) and/or other configuration and/or environmental error(s). In some embodiments, such configuration error(s) may include sub-optimal but still functional configurations, such as where a more efficient and/or less error-prone configuration is identifiable. For example, in a circumstance where a third party system is reading from a primary Experion server via OPC, the apparatus 200 may identify that data may be lost during server switchover, and may recommend using a redirection manager instead to reduce and/or eliminate such data loss.

Additionally or alternatively, the apparatus 200 may be configured to identify one or more configuration error(s) associated with embedded devices of a control system. For example, the apparatus 200 may be configured to identify controller configuration error(s), such as network issue(s), bootp service issue(s), port configuration error(s), and/or base IP configuration error(s). Additionally or alternatively, the apparatus 200 may identify controller checkpoint save and/or restoration failures, for example due to checkpoint file corruption, checkpoint file unavailability, and/or checkpoint service failure.

Additionally or alternatively, the apparatus 200 may be configured to identify one or more configuration error(s) associated with networking issues between components of a control system. For example, the apparatus 200 may be configured for identifying configuration errors associated with one or a plurality of fault tolerance ethernet alarms, such as those resulting in loss of view and/or loss of control errors, based on crossover cable configuration configurations, updated switch firmware error(s), and/or configurations above recommended limits. Additionally or alternatively, the apparatus 200 may identify configuration errors caused by errors in CANE tree loading, lack of CANE tree configurations, and/or a lack of security permission configurations. Additionally or alternatively, the apparatus 200 may identify time synchronization and/or datetime synchronization errors, for example due to errors in connectivity with a NTP and/or SNTP configured source. Additionally or alternatively, the apparatus 200 may identify configuration error(s) associated with ill-defined rules, domain-related network policies, security systems, and/or the like. For example, such configurations may expose unlimited and unmonitored access to network resources and data that improperly leaves such resources vulnerable.

Additionally or alternatively, the apparatus 200 may be configured to identify one or configuration error(s) associated with one or more controller component(s). For example, the apparatus 200 may be configured for identifying a program block and/or processing errors resulting processing resource usage above one or more thresholds (e.g., CPU usage above a CPU usage threshold). Additionally or alternatively, the apparatus 200 may identify invalid TO reference configurations, for example due to two controllers sharing an input/output link and/or input/output modules residing on the link, and/or invalid configurations of such input/output module(s). Additionally or alternatively, the apparatus 200 may identify whether one or more configuration parameters and/or operating parameters associated with a given controller, such as one or more live parameters, are operating within an acceptable range.

Additionally or alternatively, the apparatus 200 may be configured to identify one or more configuration error(s) associated with release upgrades (e.g., migrations) and/or patch update(s). For example, the apparatus 200 may identify where one or more configuration updates applied to a component of a control system. Non-limiting examples include security configuration(s), firewall setting(s), and/or the like. In some embodiments, the apparatus 200 is configured to identify updated configuration(s) that would result in a configuration error over an extended time interval.

CONCLUSION

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communications network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communications network. Examples of communications networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communications network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An apparatus for control system configuration error processing, the apparatus comprising at least one processor and at least one non-transitory memory, the at least one non-transitory memory having computer-coded instructions stored thereon, wherein the computer-coded instructions, in execution with the at least one processor, configure the apparatus to:
collect a configuration log set associated with a control system;
identify, based on at least the configuration log set and a standard configuration data object, a configuration error set associated with at least one subcomponent of the control system;
generate a configuration report data object based on the identified configuration error set;
receive a user-submitted timestamp interval; and
cause rendering of a configuration action playback interface associated with a configuration action recording data object, wherein the configuration action playback interface is configured based on at least the configuration error set, and wherein the configuration action playback interface is configured for user interaction, wherein the configuration action recording data object is configured based on the user-submitted timestamp interval.

2. An apparatus for control system configuration error processing, the apparatus comprising at least one processor and at least one non-transitory memory, the at least one non-transitory memory having computer-coded instructions stored thereon, wherein the computer-coded instructions, in execution with the at least one processor, configure the apparatus to:
collect a configuration log set associated with a control system;
identify, based on at least the configuration log set and a standard configuration data object, a configuration error set associated with at least one subcomponent of the control system;
generate a configuration report data object based on the identified configuration error set;
cause rendering of a configuration action playback interface associated with a configuration action recording data object, wherein the configuration action playback interface is configured based on at least the configuration error set, and wherein the configuration action playback interface is configured for user interaction, wherein the configuration action recording data object is retrieved from at least one datastore;
record display data for at least one display associated with operating the control system; and
store the configuration action recording data object to at least one datastore based on at least the display data.

3. A computer-implemented method for control system configuration error processing, the computer-implemented method comprising:
collecting a configuration log set associated with a control system;
identifying, based on at least the configuration log set and a standard configuration data object, a configuration error set associated with at least one subcomponent of the control system;
generating a configuration report data object based on the identified configuration error set;
receiving a user-submitted timestamp interval; and
causing rendering of a configuration action playback interface associated with a configuration action recording data object, wherein the configuration action playback interface is configured based on at least the configuration error set, and wherein the configuration action playback interface is configured for user interaction, wherein the configuration action recording data object is configured based on the user-submitted timestamp interval.

4. A computer-implemented method for control system configuration error processing, the computer-implemented method comprising:
collecting a configuration log set associated with a control system;
identifying, based on at least the configuration log set and a standard configuration data object, a configuration error set associated with at least one subcomponent of the control system;
generating a configuration report data object based on the identified configuration error set;
causing rendering of a configuration action playback interface associated with a configuration action recording data object, wherein the configuration action playback interface is configured based on at least the configuration error set, and wherein the configuration action playback interface is configured for user interaction, wherein the configuration action recording data object is retrieved from at least one datastore;
recording display data for at least one display associated with operating the control system; and
storing the configuration action recording data object to at least one datastore based on at least the display data.

* * * * *